(12) United States Patent
Fukuhara

(10) Patent No.: US 8,873,878 B2
(45) Date of Patent: Oct. 28, 2014

(54) IMAGE PROCESSING APPARATUS AND METHOD WITH REDUCED PROCESSING LOAD

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 13/349,438

(22) Filed: Jan. 12, 2012

(65) Prior Publication Data

US 2012/0189223 A1 Jul. 26, 2012

(30) Foreign Application Priority Data

Jan. 21, 2011 (JP) ................................ P2011-010527

(51) Int. Cl.
| | | |
|---|---|---|
| *G06K 9/36* | (2006.01) | |
| *H04N 19/149* | (2014.01) | |
| *H04N 19/132* | (2014.01) | |
| *H04N 19/184* | (2014.01) | |
| *H04N 19/48* | (2014.01) | |
| *H04N 19/64* | (2014.01) | |

(52) U.S. Cl.
CPC ... *H04N 19/00309* (2013.01); *H04N 19/00181* (2013.01); *H04N 19/00127* (2013.01); *H04N 19/00563* (2013.01); *H04N 19/00842* (2013.01)
USPC .......................................... 382/248; 382/232

(58) Field of Classification Search
None
See application file for complete search history.

(56) References Cited

U.S. PATENT DOCUMENTS

| | | | |
|---|---|---|---|
| 6,990,245 B2 | 1/2006 | Fukuhara et al. | |
| 7,072,519 B2 | 7/2006 | Fukuhara et al. | |
| 7,333,659 B2 * | 2/2008 | Togashi | 382/232 |
| 7,961,964 B2 | 6/2011 | Fukuhara et al. | |
| 2002/0064232 A1 * | 5/2002 | Fukuhara et al. | 375/240.26 |
| 2003/0063810 A1 * | 4/2003 | Chebil | 382/240 |
| 2003/0163209 A1 * | 8/2003 | Fukuhara et al. | 700/55 |
| 2004/0136596 A1 * | 7/2004 | Oneda et al. | 382/232 |
| 2004/0264785 A1 * | 12/2004 | Suino et al. | 382/232 |
| 2006/0228028 A1 * | 10/2006 | Kadowaki | 382/232 |
| 2006/0228034 A1 * | 10/2006 | Mizuno et al. | 382/251 |
| 2009/0245384 A1 * | 10/2009 | Fukuhara et al. | 375/240.24 |
| 2010/0092097 A1 | 4/2010 | Fukuhara et al. | |
| 2010/0119167 A1 * | 5/2010 | Ikeda et al. | 382/233 |

OTHER PUBLICATIONS

D Taubman, "High performance scalable image compression with EBCOT", IEEE transactions on Image Processing, 2000.*

* cited by examiner

*Primary Examiner* — Li Liu

(74) *Attorney, Agent, or Firm* — Frommer Lawrence & Haug LLP; William S. Frommer; Ellen Marcie Emas

(57) ABSTRACT

An image processing apparatus includes: a rate control section that performs rate control of output data by preferentially deleting lower-level-side coded data, as necessary, from respective pieces of coded data where respective bit-planes with levels higher than a predetermined level of a bit-plane group, in which coefficient data obtained by orthogonally transforming image data is developed in a bit depth direction, are coded; and a synthesizing section that generates the output data by synthesizing the coded data, from which the lower-level-side coded data is preferentially deleted as necessary by the rate control section, and respective bit-planes with levels lower than the predetermined level of the bit-plane group.

10 Claims, 31 Drawing Sheets

DIVISION LEVEL = 3
(H: HIGH FREQUENCY, L: LOW FREQUENCY)

FIG. 7

| Values(bits) MSB　　LSB | Code-block style |
|---|---|
| xxxx xxx0<br>xxxx xxx1 | No selective arithmetic coding bypass<br>Selective arithmetic coding bypass |
| xxxx xx0x<br>xxxx xx1x | No reset of context probabilities on coding pass boundaries<br>Reset of context probabilities on coding pass boundaries |
| xxxx x0xx<br>xxxx x1xx | No termination on each coding pass<br>Termination on each coding pass |
| xxxx 0xxx<br>xxxx 1xxx | No vertically causal context<br>Vertically causal context |
| xxx0 xxxx<br>xxx1 xxxx | No predictable termination<br>Predictable termination |
| xx0x xxxx<br>xx1x xxxx | No segmentation symbols are used<br>Segmentation symbols are used |
| 00xx xxxx~<br>11xx xxxx | How many number of bitplanes from MSB shall be encoded (1~4). |

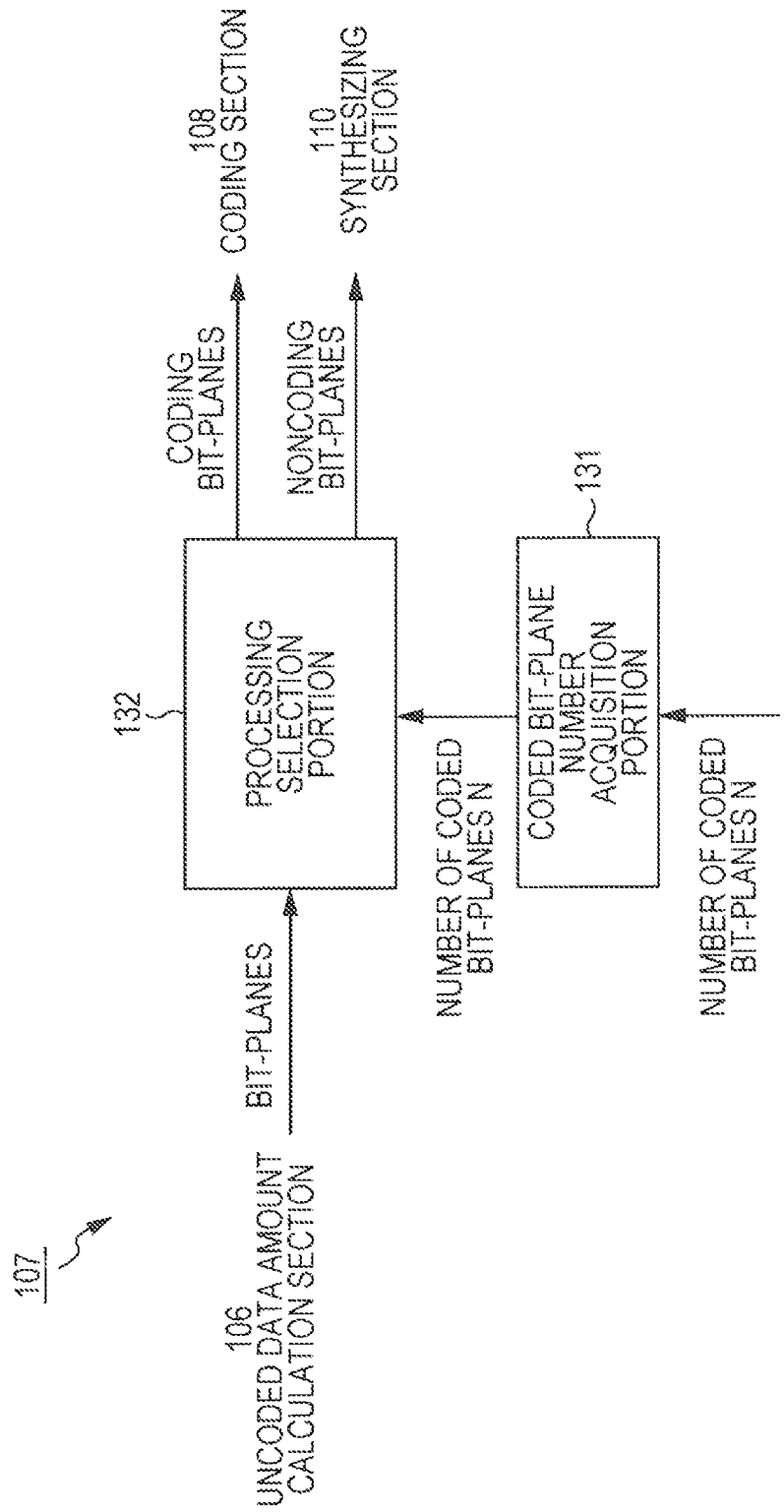

FIG. 9

| BIT-PLANE NUMBER | TYPE OF CODING PASS | CODING OPERATION |
|---|---|---|
| 0 | CP (Cleanup) | AC (Arithmetic coding) |
| 1 | SP (Significance propagation) | AC |
| 1 | MR (Magnitude refinement) | AC |
| 1 | CP | AC |
| 2 | SP | AC |
| 2 | MR | AC |
| 2 | CP | AC |
| 3 | SP | AC |
| 3 | MR | AC |
| 3 | CP | AC |
| 4 | SP | AC |
| 4 | MR | AC |
| 4 | CP | AC, terminate |
| ... | ... | ... |
| Final | SP | Raw |
| Final | MR | Raw, terminate |
| Final | CP | AC, terminate |

| BIT-PLANE NUMBER | TYPE OF CODING PASS | CODING OPERATION |
|---|---|---|
| 0 | CP (Cleanup) | AC (Arithmetic coding) |
| 1 | SP (Significance propagation) | AC |
| 1 | MR (Magnitude refinement) | AC |
| 1 | CP | AC |
| 2 | SP | AC |
| 2 | MR | AC |
| 2 | CP | AC |
| 3 | SP | Raw |
| 3 | MR | Raw, terminate |
| 3 | CP | AC, terminate |
| 4 | SP | Raw |
| 4 | MR | Raw, terminate |
| 4 | CP | AC, terminate |
| ... | ... | ... |
| Final | SP | Raw |
| Final | MR | Raw, terminate |
| Final | CP | AC, terminate |

(BP = UP TO 2)

IMAGE PROCESSING APPARATUS AND METHOD WITH REDUCED PROCESSING LOAD

BACKGROUND

The present disclosure relates to an image processing apparatus and an image processing method, and particularly to an image processing apparatus and an image processing method capable of reducing load of coding processing and decoding processing.

In the related art, as a standard of image coding, there is JPEG 2000 (for example, refer to Japanese Patent No. 3906630). JPEG 2000 is provided with two lossless and lossy options, and has different advantages in scalability (resolution, image quality, component, or the like). JPEG 2000 is used, as lossy compression, in for example, digital cinema. According to DCI standard (Digital Cinema Initiatives), JPEG 2000 Part-1 was selected to be used as coding and decoding techniques.

Japanese Patent No. 3906630 discloses an image coding apparatus which includes both a fixed-point type wavelet transformer constituted by a bit shifter and a wavelet transformer and an integer type wavelet transformer constituted by a wavelet transformer and which is capable of performing both a lossless transform and a lossy transform so as to thereby increase the degree of freedom in selection of image quality and compression ratio.

However, in the above-mentioned JPEG 2000 format, there is a concern that the processing load thereof is too large to be practical. Further, there is a concern that, as the processing load increases, the time necessary to execute coding increases to such an extent that it exceeds an allowable range.

Accordingly, there has been proposed means for reducing the calculation load in a case of lossless coding of JPEG 2000 (for example, refer to Japanese Unexamined Patent Application Publication No. 2010-93669).

SUMMARY

However, in a case of lossy coding, the proposition has not been sufficient. In the case of lossy coding of JPEG 2000, it is necessary to perform rate control based on the target amount of code, and thus it is difficult to perform the control as compared with the case of lossless coding. For this reason, even though the method of reducing the load of lossless coding of JPEG as disclosed in Japanese Unexamined Patent Application Publication No. 2010-93669 is simply applied to lossy coding, there is still a concern that it is difficult to appropriately perform the rate control.

The disclosure has been proposed in view of the above situation, and addresses the issue of reducing the load even in the case of lossy coding by appropriately performing the rate control.

According to a first embodiment of the disclosure, provided is an image processing apparatus including: a rate control section that performs rate control of output data by preferentially deleting lower-level-side coded data, as necessary, from respective pieces of coded data where respective bit-planes with levels higher than a predetermined level of a bit-plane group, in which coefficient data obtained by orthogonally transforming image data is developed in a bit depth direction, are coded; and a synthesizing section that generates the output data by synthesizing the coded data, from which the lower-level-side coded data is preferentially deleted as necessary by the rate control section, and respective bit-planes with levels lower than the predetermined level of the bit-plane group.

It is preferable that the rate control section should appropriately delete the coded data such that an amount of code of the coded data included in the output data is equal to or less than a predetermined target amount of code.

It is preferable that the image processing apparatus should further include a target code amount calculation portion that calculates the target amount of code, and it is also preferable that the rate control section should appropriately delete the coded data such that the amount of code of the coded data included in the output data is equal to or less than the target amount of code calculated by the target code amount calculation portion.

It is preferable that the target code amount calculation portion should calculate the target amount of code by subtracting an amount of uncoded data, which is a total amount of data of the respective bit-planes with the levels lower than the predetermined level of the bit-plane group, from a total amount of allocated data.

It is preferable that the image processing apparatus should further include an uncoded data amount calculation section that calculates the amount of uncoded data, and it is also preferable that the target code amount calculation portion should calculate the target amount of code by subtracting the amount of uncoded data, which is calculated by the uncoded data amount calculation section, from the total amount of data.

It is preferable that the image processing apparatus should further include a coding section that codes the bit-planes, and it is also preferable that the rate control section should perform rate control of output data by preferentially deleting the lower-level-side coded data, as necessary, from the respective pieces of the coded data which is obtained by causing the coding section to code the respective bit-planes with the levels higher than the predetermined level.

It is preferable that the rate control section should delete the lower-level-side coded data by controlling the coding section so as not to code the lower-level-side coded data as necessary.

It is preferable that the image processing apparatus should further include a selection section that selects processing for the bit-planes. It is preferable that the selection section should select the respective bit-planes with the levels higher than the predetermined level as bit-planes for performing coding. It is preferable that the coding section should code the respective bit-planes which are selected by the selection section. In addition, it is also preferable that the rate control section should code the lower-level-side coded data as necessary by controlling the coding section.

It is preferable that the rate control section should delete the lower-level-side coded data from the coded data, which is generated by the coding section, by not preferentially synthesizing the lower-level-side coded data.

According to a second embodiment of the disclosure, provided is an image processing method of an image processing apparatus. In the method, a rate control section of the image processing apparatus performs rate control of output data by preferentially deleting lower-level-side coded data, as necessary, from respective pieces of coded data where respective bit-planes with levels higher than a predetermined level of a bit-plane group, in which coefficient data obtained by orthogonally transforming image data is developed in a bit depth direction, are coded. In addition, a synthesizing section of the image processing apparatus generates the output data by synthesizing the coded data, from which the lower-level-side coded data is preferentially deleted as necessary, and respective bit-planes with levels lower than the predetermined level of the bit-plane group.

According to a third embodiment of the disclosure, provided is an image processing apparatus including: a decoding section that decodes coded data which is generated by coding a part of higher-level side bit-planes among bit-planes with levels higher than a predetermined level of a bit-plane group in which coefficient data obtained by orthogonally transforming image data is developed in a bit depth direction; a bit-plane insertion section that inserts prescribed inserting bit-planes between respective bit-planes, which are obtained by causing the decoding section to decode the coded data, and bit-planes which are not coded and have levels lower than the predetermined level; and a bit-plane synthesizing section that synthesizes bit-plane groups, between which the inserting bit-planes are inserted by the insertion section, in a bit depth direction.

It is preferable that the bit-plane insertion section should insert inserting bit-planes, of which all coefficient values are zero, as the inserting bit-planes.

It is preferable that the image processing apparatus should further include an inserting bit-plane generation section that generates the inserting bit-planes.

It is preferable that the inserting bit-plane generation section should generate the inserting bit-planes by a value of difference between the number of bit-planes, which is obtained when the coefficient data is developed in the bit depth direction, and the number of bit-planes which is obtained when the decoding section decodes the coded data.

It is preferable that the image processing apparatus should further include an extraction section that extracts the number of bit-planes, which is obtained when the coefficient data is developed in the bit depth direction, from a code stream.

It is preferable that the image processing apparatus should further include a processing selection section that selects decoding only for the coded data included in the code stream by the decoding section. In addition, it is also preferable that the decoding section should decode the coded data which is selected by the processing selection section.

According to a fourth embodiment of the disclosure, provided is an image processing method of an image processing apparatus. In the method, a decoding section of the image processing apparatus decodes coded data which is generated by coding a part of higher-level side bit-planes among bit-planes with levels higher than a predetermined level of a bit-plane group in which coefficient data obtained by orthogonally transforming image data is developed in a bit depth direction, and a bit-plane insertion section of the image processing apparatus inserts prescribed inserting bit-planes between respective bit-planes, which are obtained by decoding the coded data, and bit-planes which are not coded and have levels lower than the predetermined level. In addition, a bit-plane synthesizing section of the image processing apparatus synthesizes bit-plane groups, between which the inserting bit-planes are inserted, in the bit depth direction.

In the embodiment of the disclosure, the rate control of output data is performed by preferentially deleting the lower-level-side coded data, as necessary, from the respective pieces of the coded data where the respective bit-planes with the levels higher than the predetermined level of the bit-plane group, in which the coefficient data obtained by orthogonally transforming the image data is developed in the bit depth direction, are coded. Then, the output data is generated by synthesizing the coded data, from which the lower-level-side coded data is preferentially deleted as necessary, and the respective bit-planes with the levels lower than the predetermined level of the bit-plane group.

In the embodiment of the disclosure, the coded data is decoded, where the coded data is generated by coding a part of the higher-level side bit-planes among the bit-planes with the levels higher than the predetermined level of the bit-plane group in which the coefficient data obtained by orthogonally transforming the image data is developed in the bit depth direction. Then, the prescribed inserting bit-planes are inserted between respective bit-planes, which are obtained by decoding the coded data, and the bit-planes which are not coded and have the levels lower than the predetermined level, and the bit-plane groups, between which the inserting bit-planes are inserted, are synthesized in the bit depth direction.

According to the embodiments of the disclosure, it is possible to process an image. In particular, by appropriately performing the rate control, it is possible to reduce the load even in the case of lossy coding.

BRIEF DESCRIPTION OF THE DRAWINGS

FIG. 7 is a diagram illustrating an example of a configuration of a SPcoc or SPcod parameter;

FIG. 8 is a block diagram illustrating an example of a principal configuration of the selection section of FIG. 1;

FIG. 9 is a diagram illustrating an example of bit-plane selection;

FIG. 10 is a diagram illustrating another example of bit-plane selection;

DETAILED DESCRIPTION OF EMBODIMENTS

Figure 1:
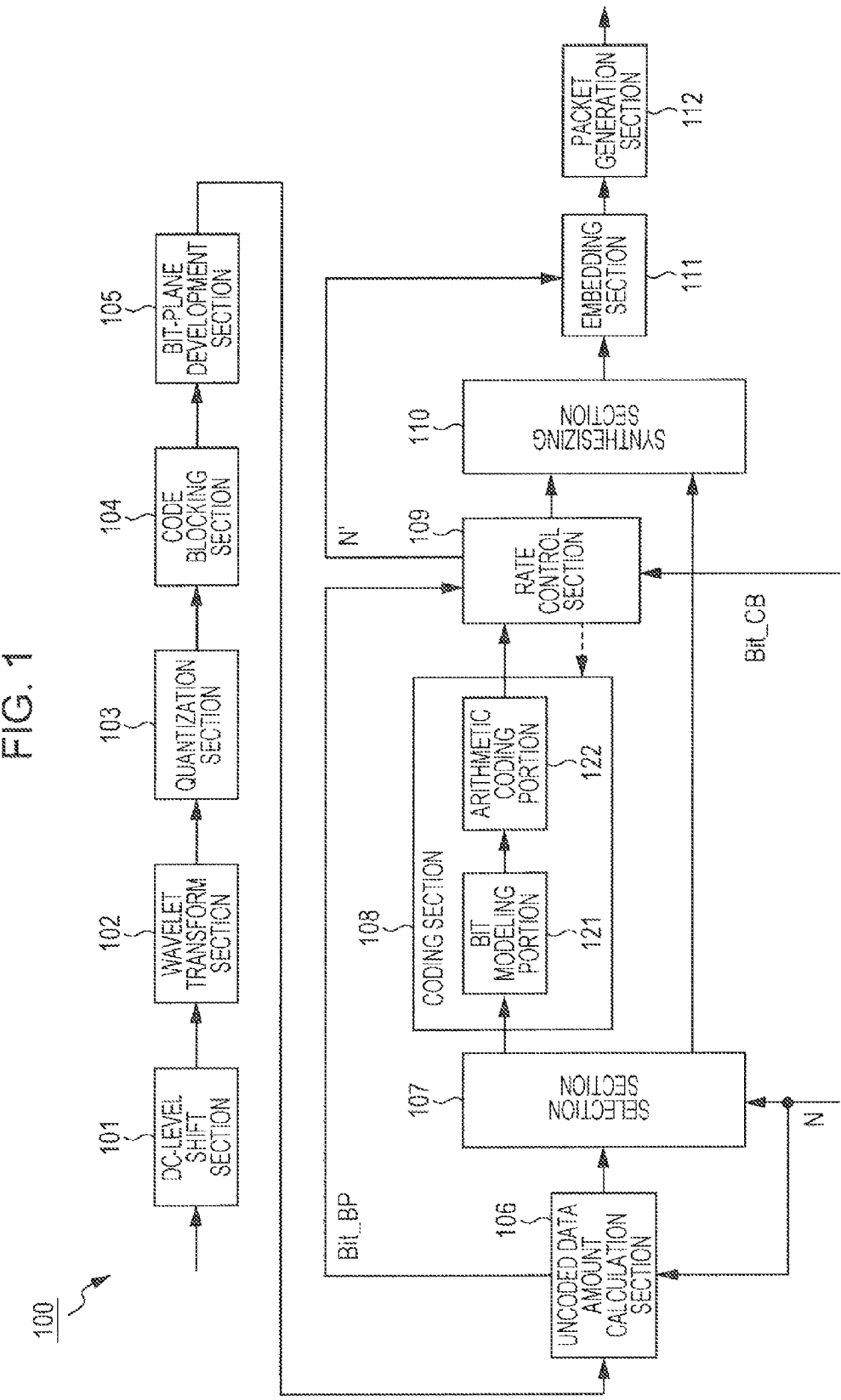
FIG. 1 is a block diagram illustrating an example of a principal configuration of an encoder.

Hereinafter, best modes for carrying out the disclosure (hereinafter referred to as embodiments) will be described. In addition, the description will be given in the order of the following items.

1. First Embodiment (Encoder)
2. Second Embodiment (Decoder)
3. Third Embodiment (Encoder)
4. Fourth Embodiment (Personal Computer)

1. First Embodiment

Brief Overview

In the related art, an archive system or an image database stores and holds a non-compressed image which is called a master image, codes the image as necessary, and performs an operation, which is for transferring a coding result file through network or storing the file in a recording medium, or the like.

In film making, first, filming is performed by using 35 or 60 mm film, and the film is converted into digital data by using an apparatus which is called a film scan converter. The digitalized film source is set as a master image.

In a case of medical use, a film of an X-ray picture is subjected to film scan, and the digital data, which is obtained by digital conversion, is set as a master image.

Further, some of recent single-lens reflex digital cameras and the like are able to store RAW data or RGB data, which is acquired from an image sensor of CCD (Charge Coupled Device) or CMOS (Complementary Metal Oxide Semiconductor), in a memory card without coding the data.

The non-coded (uncoded) master image is important since there is no loss in data as an image, but the data size thereof is large. Accordingly, when the master image is transferred through a network, or when a large number of images are stored in the memory card, it is difficult to perform a certain coding on the master image.

Further, even when such a master image is recorded, there is a limitation on the capacity of the hard disk in which the master image is recorded. Accordingly, in order to store a larger number of master images in the hard disk, it is preferable to code the master images in a lossless manner and then store the images. At this time, it is convenient that the master images are saved in a low-cost recording medium such as a tape.

As techniques of lossless coding, for example, there are Zip, LZ77, and the like, but they are inappropriate for image compression (compressibility is bad). Further, in JPEG (Joint Photographic Experts Group) of International Standard, lossless coding is standardized as JPEG-LS, but its practicality is low.

As the standard of lossless coding, further, there is JPEG 2000. JPEG 2000 is provided with two lossless and lossy options, and has different advantages in scalability (resolution, image quality, component, or the like). JPEG 2000 is used, as lossy compression, in, for example, digital cinema. According to DCI standard (Digital Cinema Initiatives), JPEG 2000 Part-1 was selected to be used as coding and decoding techniques.

Further, JPEG 2000 is also used as lossless coding. For example, JPEG 2000 is used in coding processing at the time of temporarily storing uncoded master images. Further, JPEG 2000 is used in a case where, by using scalability as a characteristic of JPEG 2000, first, lossless coding is performed to generate a lossless file, and the file is converted into a lossy file such as a DCI standard as necessary.

Japanese Patent No. 3906630 discloses an image coding apparatus which includes both a fixed-point type wavelet transformer constituted by a bit shifter and a wavelet transformer and an integer type wavelet transformer constituted by a wavelet transformer and which is capable of performing both a lossless transform and a lossy transform so as to thereby increase the degree of freedom in selection of image quality and compression ratio.

However, in the above-mentioned JPEG 2000 format, the processing load thereof is too large to be practical. The entropy coding of JPEG 2000 employs a technique called EBCOT (Embedded Block Coding with Optimized Truncation) in which bit modeling and arithmetic coding are combined. EBCOT is based on high compression performance of JPEG 2000, while the calculation load thereof is very large. In the case of lossless coding of JPEG 2000, EBCOT is performed on all bit-planes, and thus the calculation load further increases. Accordingly, when an encoder of lossless coding system of JPEG 2000 is implemented, the hardware cost increases to such an extent that it exceeds an allowable range due to the magnitude of the load, and thus there is a concern that it is difficult to implement the encoder.

Further, there is a concern that, as the processing load increases, the time necessary to execute coding increases to such an extent that it exceeds an allowable range. For example, if the master image based on DCI standard is a high resolution image (for example 4K×2K) and the master image is coded in a lossless manner through lossless coding system of JPEG 2000 by an amount of a single picture, in a general encoder, it is necessary for the processing to take several seconds. With this pace, if the contents corresponding to about two hours are coded, it is necessary for the coding to take a period of several days as a whole. When the processing time increases as described above, there is a concern that, for example, not only hardware occupancy and processing costs such as electricity expense but also the employment costs of workers may increase.

Accordingly, it is greatly preferable to provide means for reducing the calculation load of JPEG 2000 compression without losing compressibility.

The disclosure has been made in order to solve the above-mentioned problems, and according to the disclosure, it is possible to reduce the load of coding or decoding of data.

For example, Japanese Unexamined Patent Application Publication No. 2010-93669 describes the means for reducing the calculation load in the case of lossless coding of JPEG 2000, but does not particularly describe lossy coding.

However, used wavelet transform is different between lossless coding of JPEG 2000 and lossy coding. Further, in lossy coding, the rate control according to the target amount of code is necessary. Accordingly, in the case of lossy coding, as compared with the case of lossless coding, the control is remarkably difficult. Thus, even when a method of reducing the calculation load of lossless coding processing is simply applied to lossy coding processing, it is difficult to appropriately perform the rate control while suppressing deterioration in image quality and reduction in processing speed.

Hereinafter, a description will be given of a method capable of appropriately performing the rate control while suppressing deterioration in image quality and reduction in processing speed even in lossy coding.

Encoder

FIG. 1 is a block diagram illustrating an example of a principal configuration of an encoder. The encoder shown in FIG. 1 is a coding apparatus that codes image data on the basis of JPEG (Joint Photographic Experts Group) 2000 format. The encoder codes the image data in a lossless manner.

The encoder 100 develops coefficients, which are obtained by performing wavelet transform on the image data, in a bit-plane for each code block, and performs entropy coding for each bit-plane.

In the bit-planes of JPEG 2000, random noise tends to increase on the lower-level bit side, and thus compressibility (advantage) of compression using entropy coding is lowered. In contrast, there is no great change in the processing load (disadvantage) of entropy coding even when any bit-plane is set as a processing target. That is, as the bit-plane of the processing target becomes closer to the lower-level bit side, the advantage, which can be obtained by entropy coding, becomes smaller than the disadvantage.

Therefore, the encoder 100 performs entropy coding in order from the bit-plane on the higher-level bit (MSB) side, and terminates the entropy coding at a bit-plane in the middle. That is, the encoder 100 performs entropy coding on only some bit-planes on the higher-level bit side, and outputs the remaining bit-planes on the lower-level bit side without coding them.

In other words, the encoder 100 performs entropy coding only on the higher-level-bit-side bit-planes in which obtainable effects are great, and omits coding processing for the lower-level-bit-side bit-planes in which obtainable effects are small. By omitting the coding processing, the encoder 100 is able to reduce the processing load. Further, since only the coding processing for the lower-level-bit-side bit-planes with low compressibilities is omitted, it is possible to decrease an effect on compression efficiency.

Furthermore, the encoder 100 performs rate control. Generally, when the amount of data is reduced in the rate control, the data is preferentially deleted from the lower-level-bit-side bit-planes such that deterioration in image quality is minimized (the rate control has no effect on the image quality).

However, the lower-level-bit-side bit-plane is uncoded data (non-coded data) which is not coded. That is, there is no deterioration in the lower-level-bit-side bit-planes. Accordingly, when such lower-level-bit-side bit-planes are deleted, there is a concern that the deletion has a great effect on the image quality (deterioration in image quality).

Therefore, the encoder 100 does not delete the lower-level-bit-side bit-planes, but preferentially delete the bit-planes from the lower-level bit side in the coded bit-planes which has a level higher than the lower-level-bit-side bit-planes.

In such a manner, the encoder 100 appropriately performs the rate control while suppressing deterioration in image quality and reduction in processing speed even in lossy coding. Further, by omitting the coding processing of the bit-planes to be deleted, the encoder 100 is able to improve the processing speed.

As shown in FIG. 1, the encoder 100 has a DC-level shift section 101, a wavelet transform section 102, a quantization section 103, a code blocking section 104, and a bit-plane development section 105. The encoder 100 further has an uncoded data amount calculation section 106, a selection section 107, a coding section 108, a rate control section 109, a synthesizing section 110, an embedding section 111, and a packet generation section 112.

The DC-level shift section 101 shifts the level of a DC component of image data in order to efficiently perform wavelet transform at the subsequent stage. For example, an RGB signal has a positive value (an unsigned integer). Therefore, by using this, the DC-level shift section 101 performs level shift which makes a dynamic range of the original signal half, thereby improving coding efficiency. Accordingly, when a signal having signed (both positive and negative) integer values like Cb or Cr (color difference signal) of the YCbCr signal is set as the original signal, the level shift is not performed.

The wavelet transform section 102 is typically implemented by a filter bank including a low-pass filter and a high-pass filter. Further, since a digital filter typically has an impulse response (filter coefficient) with plural tap lengths, the wavelet transform section 102 has a buffer that buffers an input image in advance to some extent that filtering can be performed.

The wavelet transform section 102 acquires the image data which is output from the DC-level shift section 101 and of which the amount is equal to or greater than the minimum amount of data necessary for the filtering. The wavelet transform section 102 performs the filtering on the image data after the DC level shift by using a prescribed wavelet transform filter, for example, thereby generating a wavelet coefficient. Moreover, the wavelet transform section 102 performs the filtering, which is for separating the image data into a low-frequency component and a high-frequency component, on the image data in vertical and horizontal directions of an image.

Figure 2:
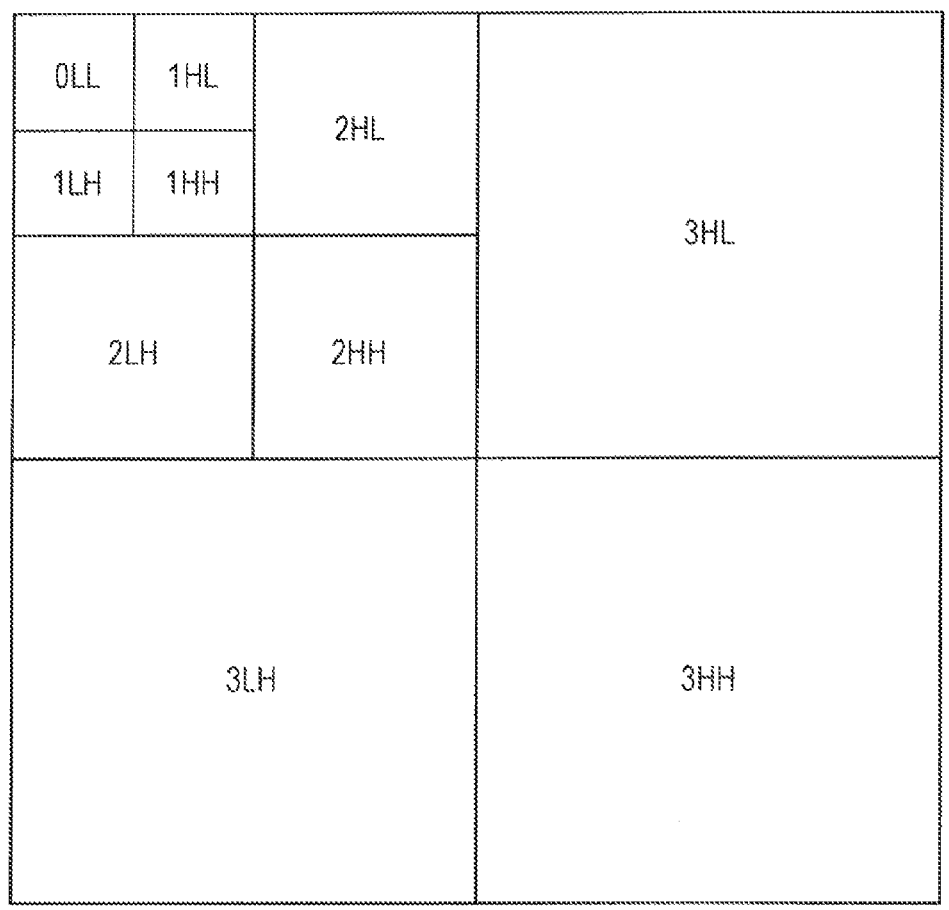
FIG. 2 is a diagram illustrating an example of a configuration of sub-bands.

In addition, the wavelet transform section 102 recursively repeats the filtering on sub-bands separated as the low-frequency component in both the vertical and horizontal directions a predetermined number of times, as shown in FIG. 2. The reason is that most of the energy of the image is concentrated in the low-frequency component.

FIG. 2 is a diagram illustrating an example of a configuration of the sub-bands which are generated by the wavelet transform processing at a division level number of 3. In this case, the wavelet transform section 102 first filters the entire image so as to thereby generate sub-bands 3 LL (not shown), 3 HL, 3 LH, and 3 HH. Subsequently, the wavelet transform section 102 again filters the generated sub-band 3 LL so as to thereby generate sub-bands 2 LL (not shown), 2 HL, 2 LH, and 2 HH. Moreover, the wavelet transform section 102 filters the generated sub-band 2 LL so as to thereby generate sub-bands 0 LL, 1 HL, 1 LH, and 1 HH.

The wavelet transform section 102 supplies the wavelet coefficients, which are obtained by the filtering, to the quantization section 103 for each sub-band. The quantization section 103 quantizes the supplied wavelet coefficients, which are acquired from the wavelet transform section 102, in response to, for example, the control of the rate control section 109. The quantization section 103 supplies the quantized coefficients to the code blocking section 104.

In addition, in the standard of JPEG 2000, the quantization processing is omitted in the case of the lossless compression. In other words, when the encoder 100 performs lossless compression, by omitting the quantization section, the wavelet coefficients, which are obtained from the wavelet transform section 102, may be supplied to the code blocking section 104.

Figure 3:
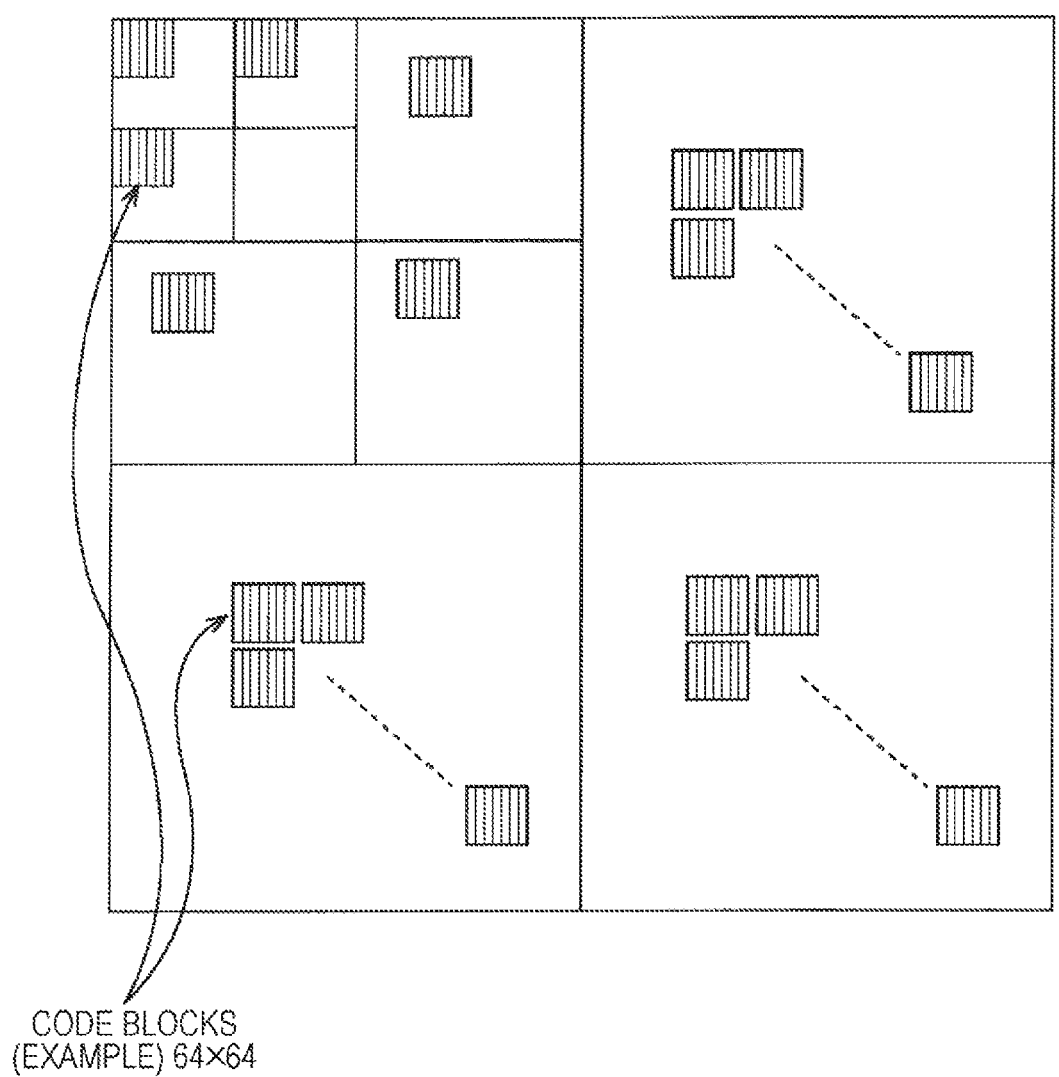
FIG. 3 is a diagram illustrating an example of code blocks in the respective sub-bands.

The code blocking section 104 divides the quantized wavelet coefficient of each sub-band into code blocks, each of which is a processing unit of the entropy coding, with predetermined sizes. FIG. 3 is a diagram illustrating a positional relationship between the code blocks in the respective sub-bands. For example, code blocks with a size of about 64×64 pixels are generated in all the divided sub-bands. In the example of FIG. 2, assuming that the size of the sub-band 3 HH having the smallest division level is 640×320 pixels, the total of the number of code blocks with 64×64 pixels is fifty. Each processing section at the subsequent stage performs processing on each block. It is needless to say that the size (the number of pixels) of the code block is determined arbitrarily.

The code blocking section 104 supplies each code block to the bit-plane development section 105. The bit-plane development section 105 develops the supplied coefficient data of each code block into a bit-plane of each level of bits.

The bit-plane is formed by dividing (slicing) a coefficient group (for example, the code block) formed of a predetermined number of wavelet coefficients for each single bit, that is, for each level. That is, the bit-plane is a set of bits (coefficient bits), which have the same level as each other, of plural data pieces each having a bit depth of plural bits.

Figure 4:
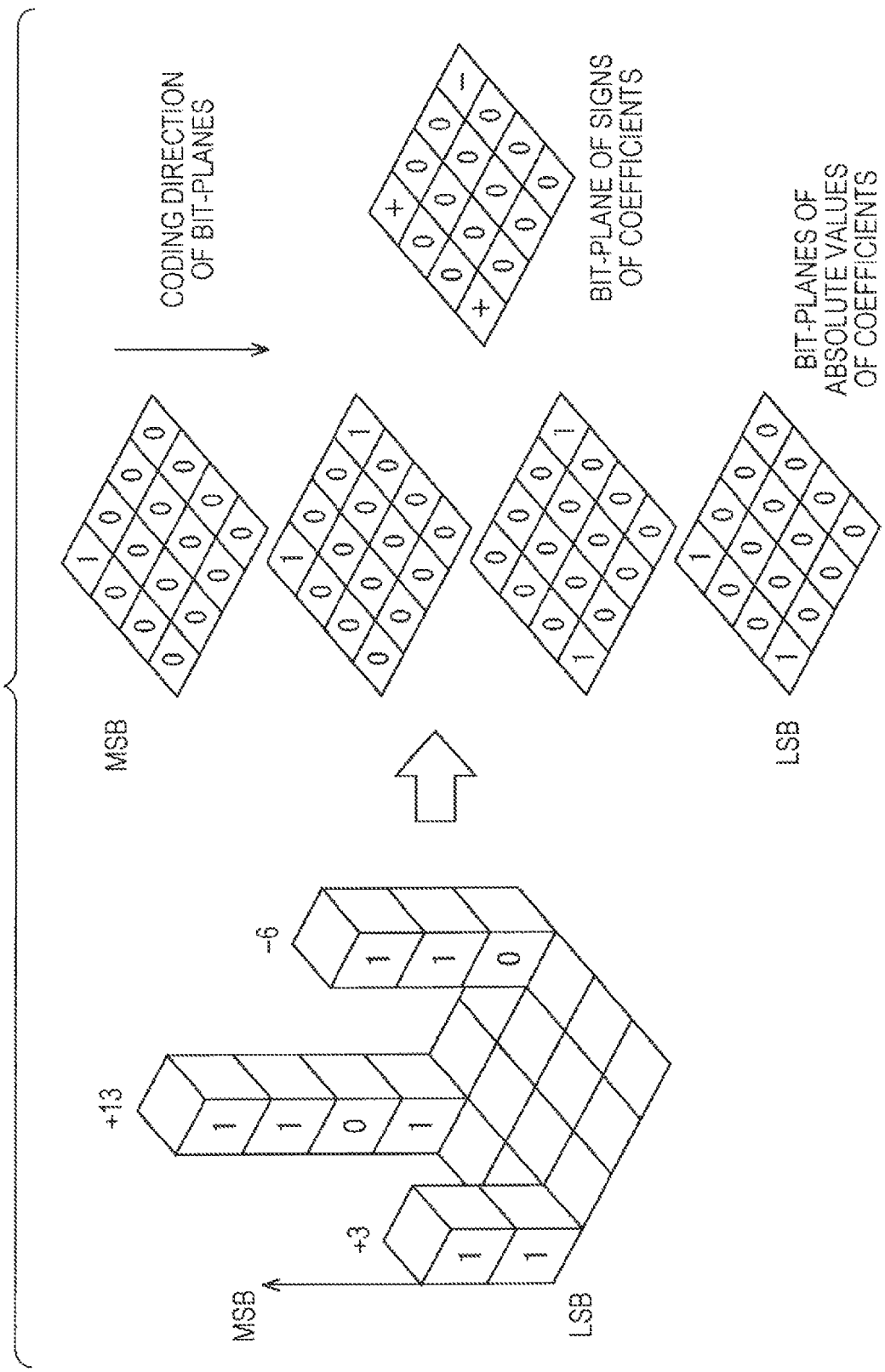
FIG. 4 is a diagram illustrating an example of bit-planes.

FIG. 4 shows a specific example thereof. The left figure of FIG. 4 shows four columns and four rows, that is, sixteen coefficients in total. Among the sixteen coefficients, the number with the largest absolute value is 13 and can be represented as 1101 in a binary-coded form. The bit-plane development 105 develops the coefficient group into four bit-planes (absolute value bit-planes) representing absolute values and one bit-plane (sign bit-plane) representing signs. That is, the coefficient group shown in the left side of FIG. 4 is developed into four absolute value bit-planes and one sign bit-plane, as shown in the right side of FIG. 4. Here, all elements of the absolute value bit-planes take 0 or 1 value. Further, elements of the bit-plane representing a sign take one of a value indicating that the value of a coefficient is positive, a value indicating that the value of a coefficient is 0, and a value indicating that the value of a coefficient is negative.

In addition, as described above, the number of coefficients in the coefficient group, which is developed into the bit-planes, is arbitrary. Hereinafter, a description will be given of a case where, in order to facilitate the processing of each section by unifying the processing units, the bit-plane development section 105 develops the coefficient into the bit-planes in each code block.

The bit-plane development section 105 supplies the bit-planes, which are developed in such a manner, to the uncoded data amount calculation section 106 in order from the most significant bit (MSB) of coefficients to the least significant bit (LSB). That is, the bit-plane development section 105 supplies the developed bit-planes to the uncoded data amount calculation section 106 in order from the higher-level bit side in the bit depth to the lower-level bit side in the bit depth.

In addition, the supply order of the bit-planes can be set to be arbitrary, but it is necessary to notify the order to the respective sections of the encoder 100 or a decoder to be described later.

The uncoded data amount calculation section 106 acquires the number of coded bit-planes N (receives designation of the number of coded bit-planes N). The number of coded bit-planes N represents the number of bit-planes which are coded for each code block (the processing unit of the development processing performed by the bit-plane development section 105). That is, the number of coded bit-planes N represents how many bit-planes are coded in the bit-plane group of each code block.

The number of coded bit-planes N, for example, may be determined in advance, and may be designated by an external section (for example, a user or the like) of the encoder 100. That is, the number of coded bit-planes N may be invariable or may be variable.

The uncoded data amount calculation section 106 performs calculation of the amount of uncoded data (Bit_BP), which is the total amount of data of the non-coded bit-planes, on the bit-planes, which are acquired from the bit-plane development section 105, by using the number of coded bit-planes N. The non-coded bit-planes are the lower-level-bit-side bit-planes which are the remainings when the bit-planes with the MSB to the N-th level from the MSB are excluded. That is, the non-coded bit-planes are bit-planes with (N+1)th level from the MSB to the LSB.

In addition, hereinafter, assuming that the levels are counted from the MSB, "the M-th level from the MSB" is referred to as "the M-th level". For example, "the N-th level from the MSB" is referred to as "the N-th level", and "the (N+1)th level from the MSB" is referred to as "the (N+1)th level".

The uncoded data amount calculation section 106 adds the amounts of the respective data pieces of the remaining lower-level-bit-side bit-planes, thereby calculating the amount of uncoded data (Bit_BP).

The uncoded data amount calculation section 106 supplies the calculated amount of uncoded data (Bit_BP) to the rate control section 109. Further, the uncoded data amount calculation section 106 supplies the bit-planes, which are acquired from the bit-plane development section 105, to the selection section 107.

The selection section 107 also acquires the number of coded bit-planes N. The selection section 107 selects, for each bit-plane, whether to code the bit-plane acquired from the uncoded data amount calculation section 106 by using the number of coded bit-planes N.

The selection section 107 supplies the bit-planes, which are determined to be coded, to the coding section 108. Further, the selection section 107 supplies the bit-planes, which are determined not to be coded, to the synthesizing section 110.

As described above, due to the characteristics of the bit-planes of JPEG 2000, as a bit-plane is closer to the MSB, the bit-plane has a stronger effect on the image quality, and the compression efficiency thereof is higher. In contrast, as a bit-plane is closer to the LSB, random noise tends to increase, and its compressibility is worse. Therefore, the selection section 107 omits coding processing for the lower-level bit-planes of which the compression efficiency is low, and selects processing for each bit-plane so as to output the uncoded bit-planes instead of the coding processing.

That is, the selection section 107 determines to code the bit-planes of the number of coded bit-planes N on the higher-level bit side, and then supplies the bit-planes to the coding section 108. In addition, the selection section 107 determines to not code the bit-planes with the levels lower than those, and then supplies the bit-planes to the synthesizing section 110.

Due to the control of the selection section 107, the encoder 100 is able to omit entropy coding for the lower-level bit-planes. Accordingly, the encoder 100 is able to reduce the load of the coding processing. Thereby, for example, it is possible to reduce costs and shorten the processing time.

The coding section 108 performs entropy coding called EBCOT (Embedded Coding with Optimized Truncation), which is prescribed by the standard of JPEG 2000, on the input bit-planes. EBCOT is a method of performing coding on each block with a predetermined size while measuring statistics of the coefficient in the block.

As shown in FIG. 1, the coding section 108 has a bit modeling portion 121 and an arithmetic coding portion 122. The bit modeling portion 121 sends a context to the arithmetic coding portion 122 by performing bit modeling on the coefficient data in the order prescribed by the standard of JPEG 2000. The arithmetic coding portion 122 performs arithmetic coding on the bit-planes by using the context.

The horizontal and vertical sizes of the code block are set by the power-of-two from 4 to 256. The generally used size is 32×32, 64×64, 128×32, or the like. Since the value of the quantization coefficient is represented by an n-bit-signed binary number, bit 0 to bit (n−2) represent respective bits from the LSB to the MSB. The remaining one bit represents a sign. The coding of the code block is performed by the following three coding passes sequentially from the bit-plane on the MSB side.

(1) Significance Propagation Pass

In the significance propagation pass of coding a certain bit-plane, the value of a bit-plane of non-significant coefficient in which at least one coefficient near eight coefficients is significant is arithmetically coded. When the value of the coded bit-plane is 1, whether the sign thereof is + or − is subsequently subjected to the arithmetic coding.

Here, the term "significance" will be described. Regarding the significance, when each coefficient is coded, the coefficient is changed into 1 which represents that the coefficient is significant, and then 1 is constantly retained. Accordingly, the significance is also defined as a flag representing whether information on a significant number is coded in advance. When a coefficient becomes significant in a certain bit-plane, in the subsequent bit-planes, it remains significant.

(2) Magnitude Refinement Pass

In the magnitude refinement pass of coding the bit-plane, the value of the bit-plane of the significant coefficient which is not coded in the significance propagation pass of coding the bit-plane is subjected to the arithmetic coding.

(3) Cleanup Pass

In the cleanup pass of coding the bit-plane, the value of the bit-plane of the non-significant coefficient which is not coded in the significance propagation pass of coding the bit-plane is subjected to the arithmetic coding. Further, when the value of the coded bit-plane is 1, whether the sign thereof is + or − is subsequently subjected to the arithmetic coding.

In addition, in the arithmetic coding in the above-mentioned three coding passes, ZC (Zero Coding), RLC (Run-Length Coding), SC (Sign Coding), and MR (Magnitude Refinement) can be separately used in accordance with a case. Here, an arithmetic code called the MQ coding is used. The MQ coding is a learning binary arithmetic code prescribed in JBIG2. In JPEG 2000, a total of 19 types of contexts are present in all the coding passes.

Figure 5:
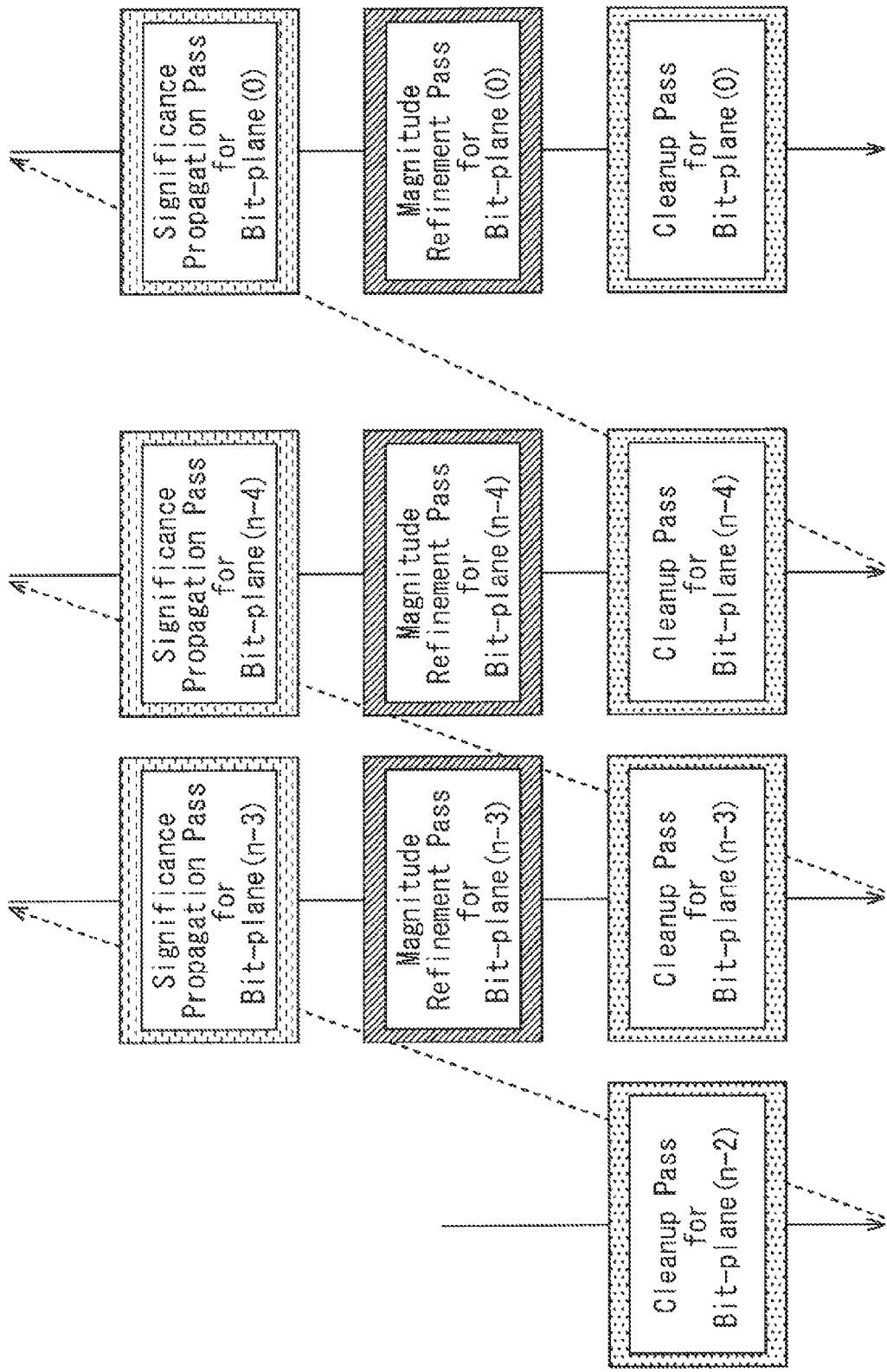
FIG. 5 is a diagram illustrating an example of a coding pass.

FIG. 5 shows an example of the order that three coding passes is used. First, the bit-plane (n−2), which is a bit-plane of the most significant bit (MSB), is coded through the cleanup pass. Subsequently, the respective bit-planes are coded one by one toward the LSB side by using the above-mentioned three coding passes in order of the significant propagation pass, the magnitude refinement pass, and the cleanup pass.

However, in practice, the coding section 108 writes, in a header, which level of the bit-plane where 1 appears first, and does not code a bit-plane (referred to as a zero bit-plane), of which all the coefficients is 0, subsequent to the MSB.

Figure 6:
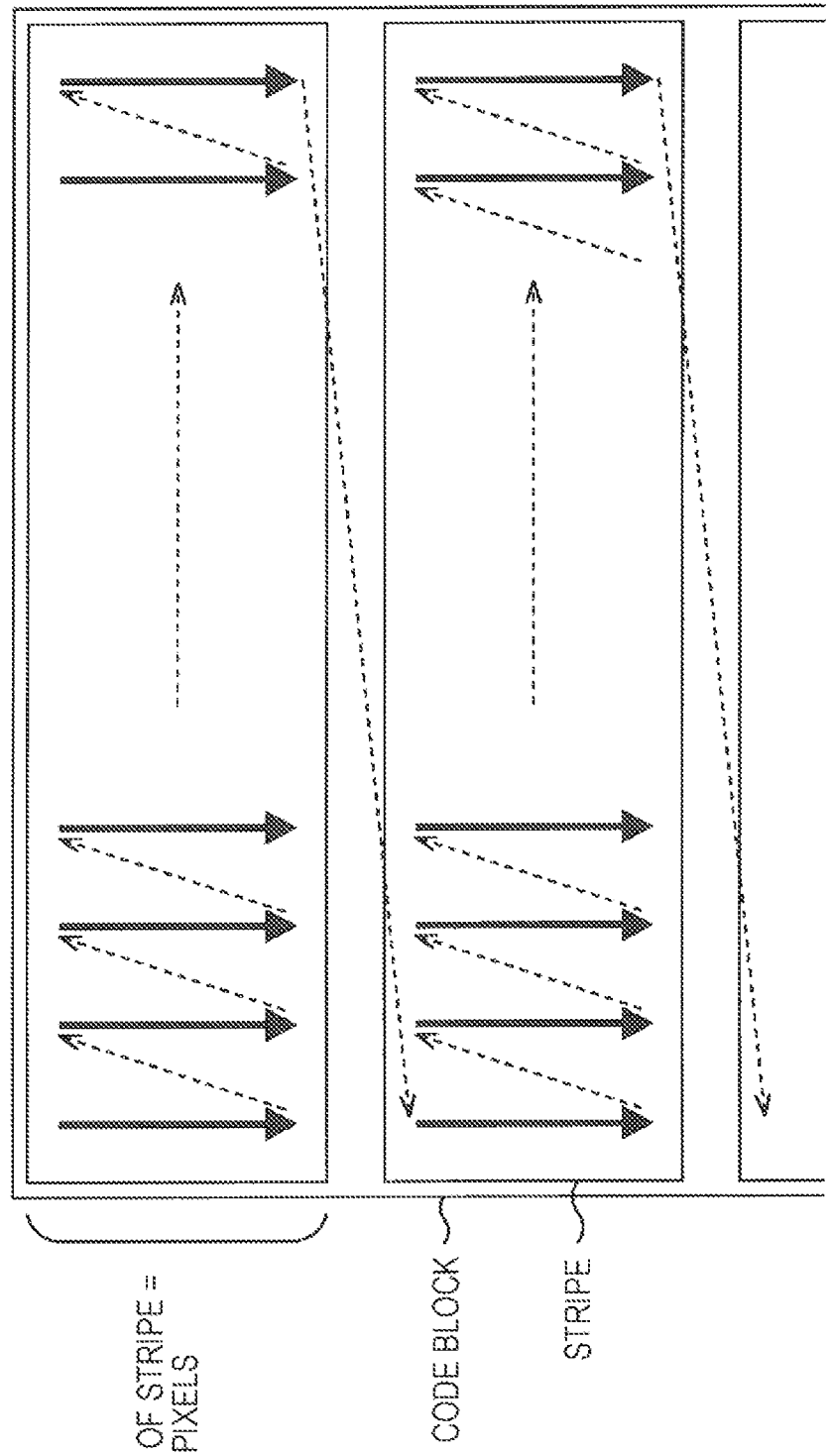
FIG. 6 is a diagram illustrating an example of scanning of coefficients.

Next, scanning of the coefficients will be described with reference to FIG. 6. The code block may be divided into stripes in every height corresponding to four coefficients. The width of the stripe is the same as the width of the code block. The scanning order is an order that all coefficients of one code block are sequentially scanned. In the code block, the scanning order is an order from the upper stripe to the lower stripe. In the stripe, the scanning order is an order from the left line to the right line. In addition, in the line, the scanning order is an order from the upper side to the lower side. All coefficients of the code block are processed in this scanning order in each coding pass.

The coding section 108 performs entropy coding on each bit-plane until being controlled not to perform coding by the rate control section 109. The arithmetic coding portion 122 of the coding section 108 supplies the generated coded data (bit-planes after coding) to the rate control section 109.

The rate control section 109 acquires the total amount of data (Bit_CB) allocated to the code blocks (processing unit of the development processing performed by the bit-plane development section 105) as processing targets (receives designation of the total amount of data (Bit_CB)). The total amount of data (Bit_CB) is designated by, for example, the control section (not shown), which controls the entire coding processing, or the like. The control section determines the total amount of data allocated to the respective code blocks in an arbitrary method on the basis of arbitrary information, and notifies the amount to the rate control section 109.

Further, the rate control section 109 acquires the amount of uncoded data (Bit_BP) which is calculated by the uncoded data amount calculation section 106.

The rate control section 109 calculates the target amount of code of the coded data supplied to the synthesizing section 110 on the basis of such information. The rate control section 109 adjusts the amount of code by deleting the coded data (bit-planes after coding), which is supplied from the coding section 108, as necessary such that the amount reaches the target amount of code (such that the amount of code of the coded data supplied to the synthesizing section 110 becomes equal to or less than the target amount of code). That is, the rate control section 109 adjusts the amount of code on a per-bit-plane basis. The rate control section 109 deletes the data preferentially from lower-level-bit-side bit-planes.

The rate control section 109 supplies the coded data (non-deleted bit-planes after coding) after the adjustment of the amount of code to the synthesizing section 110.

More specifically, the coded data (coded bit-planes) is supplied from the coding section 108 to the rate control section 109 in order from the MSB side to the LSB side. The rate control section 109 accumulates the amounts of code whenever acquiring the coded data. If the accumulated value is smaller than the target amount of code, the rate control section 109 supplies the acquired coded data to the synthesizing section 110.

If the accumulated value of the amounts of code is equal to or greater than the target amount of code, the rate control section 109 destroys the currently acquired coded data, and causes the coding section 108 to terminate the coding processing, thereby stopping the supply of the lower-level-bit-side bit-planes (coded data).

Further, the rate control section 109 notifies the number of coded bit-planes N', which represents the number of acquired bit-planes (coded data), to the embedding section 111.

In such a manner, when lowering the rate, the rate control section 109 controls such that the lower-level bit side of the bit-planes selected to be subjected to the coding processing by the selection section 107 is not preferentially coded (is not received). At this time, the rate control section 109 controls such that the further-lower-level-bit-side bit-planes (uncoded data) selected to be subjected to the coding processing by the selection section 107. Accordingly, the rate control section 109 is able to perform the rate control while suppressing deterioration in image quality.

Further, at the time of the rate control, the rate control section 109 has only to delete or leave bit-planes, and particular image processing is not necessary therefor. Furthermore, the rate control section 109 controls the operation of the coding section 108, thereby omitting unnecessary coding processing. Accordingly, the rate control section 109 is able to suppress an increase in the load of coding. That is, the rate control section 109 appropriately performs control (rate control) of the amount of code of the code stream while suppressing deterioration in image quality or an increase in the load. Consequently, the encoder 100 is able to reduce the load even in the lossy coding.

The synthesizing section 110 acquires the coded data (coded bit-plane) which is supplied from the rate control section 109. Further, the synthesizing section 110 acquires the uncoded data (bit-planes which are not coded) which is supplied from the selection section 107. The synthesizing section 110 synthesizes the coded data and the uncoded data and adds a header and the like thereto so as to thereby generate one code stream, and supplies the code stream to the embedding section 111.

The embedding section 111 embeds information, which represents the number of coded bit-planes N' supplied from the rate control section 109, at a prescribed position of the code stream which is supplied from the synthesizing section 110.

For example, the embedding section 111 multiplexes information, which represents the number of coded bit-planes N', in empty bits of the SPcoc parameters or SPcod inside the COD (Coding style default) parameter (prescribed by ISO (International Organization for Standardization) 154441 JPEG 2000 Part-1 standard) as a part for describing information on a coding condition and the like.

FIG. 7 is a diagram illustrating the embedment. The table shown in FIG. 7 describes an 8-bit configuration which is provided as the SPcod or SPcoc parameter. As shown in the table, in the lower 6 bits of the SPcod or SPcoc parameter, various kinds of information are allocated, but in the higher 2 bits from the MSB are reserved in the standard of JPEG 2000, that is, the bits are formed as empty bits. The embedding section 111 designates, for example, the number of coded bit-planes N' on the basis of the 2 bits.

In addition, the position of the embedded control information is arbitrary if it is a position which can be specified by the decoder for performing the decoding processing of the code stream. The embedment position may be determined in advance, and information, which represents the embedment position, may be separately provided. Further, the amount of the control information is also arbitrary.

For example, when the rate control section 109 does not delete the coded data, the number of coded bit-planes N' supplied from the rate control section 109 coincides with the number of coded bit-planes N. That is, in this case, in the higher 2 bits of the SPcod or SPcoc parameter, the number of bit-planes selected as bit-planes coded by the selection section 107 is embedded.

After the embedment processing, the embedding section 111 supplies the code stream to the packet generation section 112. As described above, the embedding section 111 embeds the number of coded bit-planes N' (or N) in the code stream, whereby the decoder for decoding the code stream is able to extract the information from the code stream and appropriately decode the code stream on the basis of the information. For example, other information is not necessary for the decoder, and it is possible to specify the number of bit-planes decoded from only the code stream. Thereby, it is possible to facilitate the configuration or processing of the decoder.

In addition, the information may be provided to the decoder separately from the code stream. In this case, the embedding section 111 may be omitted, whereby the processing of the encoder 100 becomes easy by that amount. However, it is necessary to determine the interchange of the information between the encoder and the decoder. Further, it is necessary for the decoder to use the separately provided information in the decoding processing.

The packet generation section 112 packetizes the supplied code stream, and outputs the respective packets generated to the outside of the encoder 100. The packets are supplied to the decoder corresponding to the encoder 100 through, for example, a prescribed transmission path or a storage medium.

Selection Section

FIG. 8 is a block diagram illustrating an example of a principal configuration of the selection section 107 of FIG. 1. As shown in FIG. 8, the selection section 107 has a coded bit-plane number acquisition portion 131 and a processing selection portion 132.

The coded bit-plane number acquisition portion 131 receives designation of the number of coded bit-planes N from a user or the control section which is not shown. That is, the coded bit-plane number acquisition portion 131 acquires the number of coded bit-planes N. In addition, as described above, the number of coded bit-planes N may be a predetermined constant. In this case, the coded bit-plane number acquisition portion 131 may retain the number of coded bit-planes N in advance. The coded bit-plane number acquisition portion 131 supplies the number of coded bit-planes N to the processing selection portion 132.

Further, the processing selection portion 132 acquires the bit-planes which are supplied through the uncoded data amount calculation section 106. The bit-planes are supplied in order from the MSB to the LSB.

The processing selection portion 132 performs control to perform the coding processing on the bit-planes (higher-level-bit-side bit-planes) higher than the N-th level where N is the number of coded bit-planes (selects the coding processing). That is, the processing selection portion 132 selects the bit-planes with levels higher than the N-th level as bit-planes (coding bit-planes) for coding, and supplies the bit-planes to the coding section 108.

Further, the processing selection portion 132 performs control so as not to perform the coding processing on the bit-planes (lower-level-bit-side bit-planes) with levels lower than the (N+1)th level (does not select the coding processing). That is, the processing selection portion 132 selects the bit-planes with levels lower than the (N+1)th level as bit-planes (noncoding bit-planes) which are not coded, and supplies the bit-planes to the synthesizing section 110.

That is, the processing selection portion 132 counts the bit-planes which are supplied in order from the MSB to the LSB, supplies, as the coding bit-planes, the bit-planes to the N-th level to the coding section 108, and supplies the bit-planes in and after the (N+1)th level as the noncoding bit-plane to the synthesizing section 110.

For example, it is assumed that the designated number of bit-planes N is "4". In this case, as shown in FIG. 9, the processing selection portion 132 supplies four bit-planes, of which the bit-plane numbers are "0" to "3", to the coding section 108 such that each of the bit-planes is coded in association with the CP pass, the SP pass, and the MR pass.

Further, the processing selection portion 132 supplies bit-planes, which exceeds the designated number of bit-planes and of which the bit-plane number is equal to or greater than "4", to the synthesizing section 110 such that the uncoded data is output without the coding processing. In particular, in the CP pass, the uncoded data is padded in accordance with byte boundaries, and is then terminated.

Further, for example, the designated number of bit-planes N is "2". In this case, as shown in FIG. 10, the processing selection portion 132 supplies two bit-planes, of which the bit-plane numbers are "0" and "1", to the coding section 108 such that each of the bit-planes is coded in association with the CP pass, the SP pass, and the MR pass.

Further, processing selection portion 132 supplies bit-planes, which exceeds the designated number of bit-planes and of which the bit-plane number is equal to or greater than "2", to the synthesizing section 110 such that the uncoded data is output without the coding processing. In particular, in the CP pass, the uncoded data is padded to be adjusted to the byte boundaries, and is then terminated.

As described above, the selection section 107 is able to easily perform control such that the bit-planes are coded by the designated number of bit-planes N and the bit-planes subsequent thereto are not coded. In other words, the encoder 100 is able to reliably control a position, at which the uncoded data is selected, on the basis of the designated number of bit-planes N.

Rate Control Section

Figure 11:
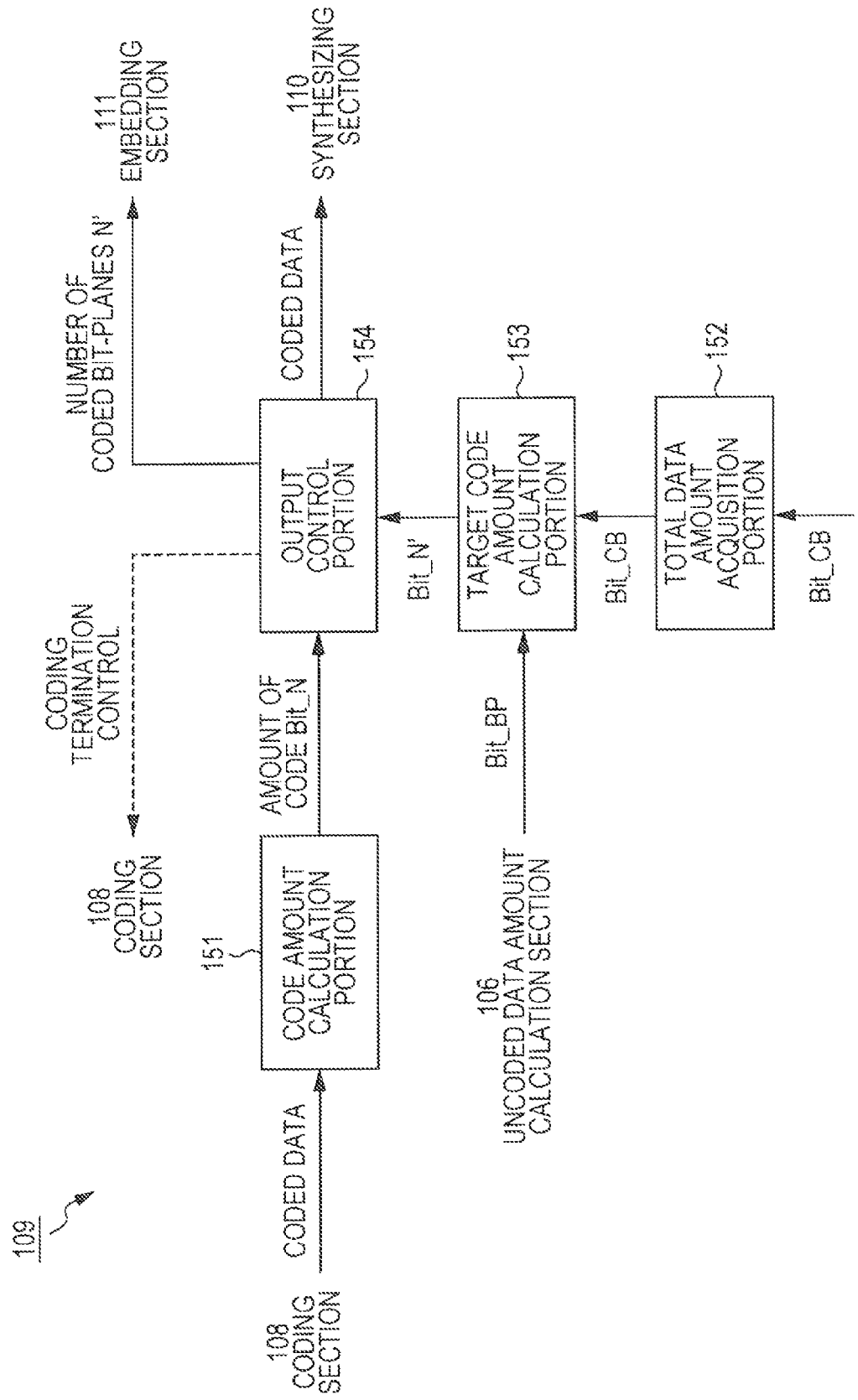
FIG. 11 is a block diagram illustrating an example of a principal configuration of the rate control section of FIG. 1.

FIG. 11 is a block diagram illustrating an example of a principal configuration of the rate control section 109 of FIG. 1. As shown in FIG. 11, the rate control section 109 has a code amount calculation portion 151, a total data amount acquisition portion 152, a target code amount calculation portion 153, and an output control portion 154.

The code amount calculation portion 151 calculates the amount of code of the coded data (Bit_N) corresponding to N-bit-planes supplied from the coding section 108, and supplies the acquired coded data and the calculated amount of code (Bit_N) to the output control portion 154.

More specifically, the code amount calculation portion 151 accumulates the amount of code at the time of supplying the coded data for each bit-plane, and supplies the coded data and the accumulated values (Bit_N) of the amount of code at the time point to the output control portion 154.

When acquiring the total amount of data (Bit_CB) which can be allocated in the processing target code stream, the total data amount acquisition portion 152 supplies the total amount of data to the target code amount calculation portion 153. The target code amount calculation portion 153 calculates the target amount of code (Bit_N') of the coded data (coded bit-planes) by using the total amount of data (Bit_CB) supplied from the total data amount acquisition portion 152 and the amount of uncoded data (Bit_BP) supplied from the uncoded data amount calculation section 106.

More specifically, the target code amount calculation portion 153 calculates the target amount of code (Bit_N') as represented by the following Expression (1).

$$\text{Bit\_}N' = \text{Bit\_}CB - \text{Bit\_}BP \qquad (1)$$

That is, the value obtained by subtracting the amount of uncoded data (Bit_BP) from the total amount of data (Bit_CB), which can be allocated in the code blocks of the processing target, is the target amount of code (Bit_N').

The target code amount calculation portion 153 supplies the target amount of code (Bit_N'), which is calculated in such a manner, to the output control portion 154.

The output control portion 154 performs the rate control on the N-bit-planes (coded data), which are supplied through the code amount calculation portion 151, such that the amount of code (Bit_N) is equal to or less than the target amount of code (Bit_N').

More specifically, when the coded data and the accumulated value of the amount of code (Bit_N) at the time point are supplied from the code amount calculation portion 151, the output control portion 154 compares the amount of code (Bit_N) with the target amount of code (Bit_N') which is acquired from the target code amount calculation portion 153.

When the amount of code (Bit_N) is smaller than the target amount of code (Bit_N'), the output control portion 154 supplies the acquired coded data to the synthesizing section 110. Further, the output control portion 154 counts the number of bit-planes of the coded data supplied to the synthesizing section 110. In this case, the coded data corresponding to the subsequent bit-planes is supplied to the code amount calculation portion 151, and the same processing is repeatedly performed thereon.

When the amount of code (Bit_N) is equal to the target amount of code (Bit_N'), the output control portion 154 supplies the acquired coded data to the synthesizing section 110. Further, the output control portion 154 controls the coding section 108 so as to thereby terminate the coding (coding for the processing target code blocks) for the bit-planes with levels lower than that. In this case, until the processing target is shifted to the subsequent code block, the coded data is not supplied to the rate control section 109.

Further, the output control portion 154 counts the number of bit-planes of the coded data supplied to the synthesizing section 110, and supplies the number of bit-planes N' of the processing target code blocks, which are hitherto supplied to the synthesizing section 110, to the embedding section 111. Furthermore, the output control portion 154 resets the count value N' (for example, sets the value to 0).

When the amount of code (Bit_N) is greater than the target amount of code (Bit_N'), the output control portion 154 destroys the acquired coded data. Further, the output control portion 154 controls the coding section 108 so as to thereby terminate the coding (coding for the processing target code blocks) for the bit-planes with levels lower than that. In this case, until the processing target is shifted to the subsequent code block, the coded data is not supplied to the rate control section 109.

Further, the output control portion 154 supplies the number of bit-planes N' of the processing target code blocks, which are hitherto supplied to the synthesizing section 110, to the embedding section 111 (in this case, since the acquired coded data is destroyed, the data is not counted). Furthermore, the output control portion 154 resets the count value N' (for example, sets the value to 0).

As described above, the rate control section 109 restricts the amount of code of the coded data supplied to the synthesizing section 110 such that it is equal to or less than the target amount of code (Bit_N') calculated on the basis of the amount of uncoded data (Bit_BP) and the total amount of data (Bit_CB) allocated in the processing target code blocks.

Figure 12:
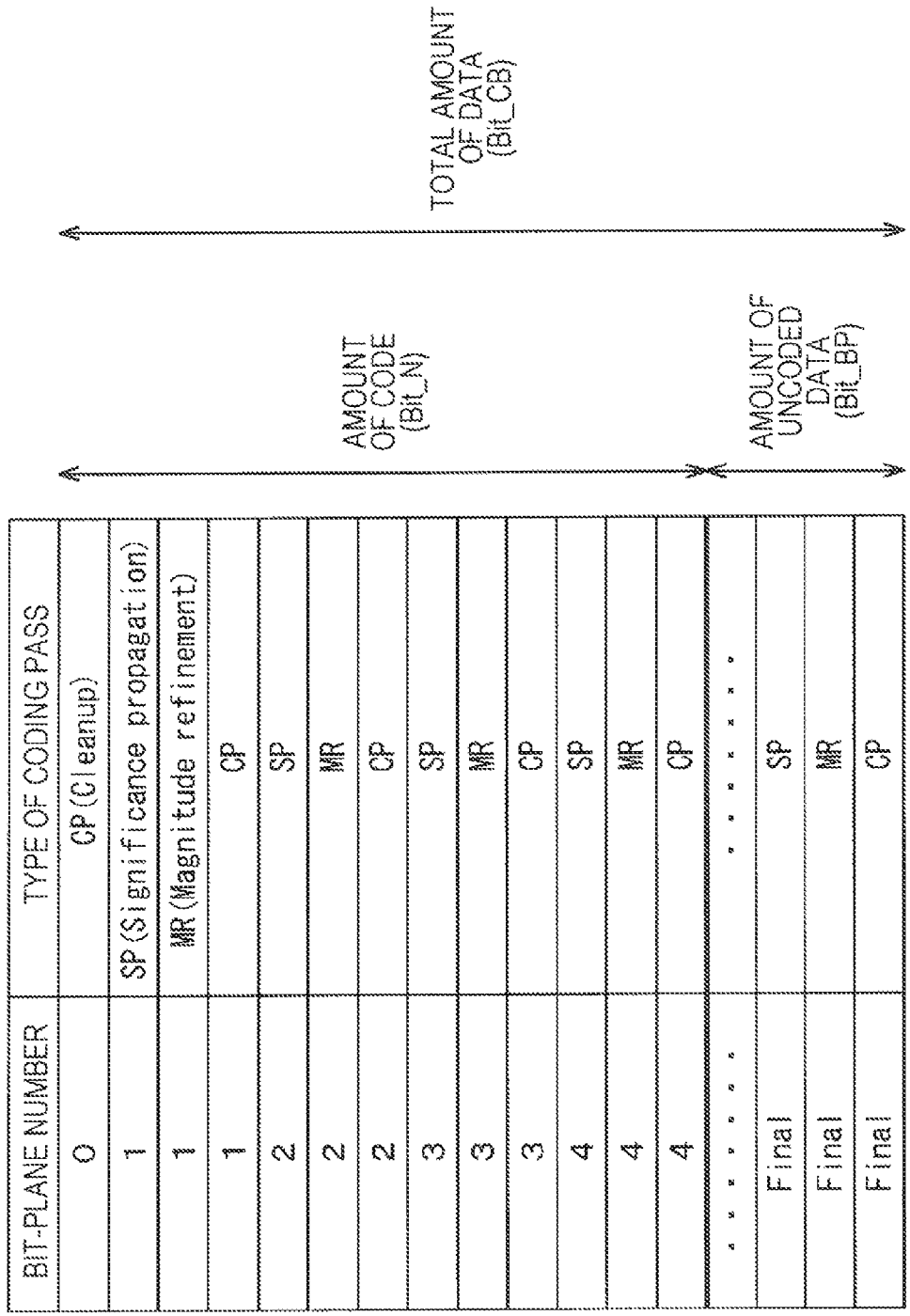
FIG. 12 is a diagram illustrating an example of rate control.

In the case of the example shown in FIG. 12, the EBCOT coding is performed in the range from the MSB of a certain code block to the bit-plane number 4. In this case, the amount of code of the coded data is Bit_N, and the amount of uncoded data, which is the amount of data of the remaining bit-planes, is Bit_BP. The sum of Bit_N and Bit_BP is the total amount of data (Bit_CB) allocated in the processing target code blocks.

However, when the value of the total amount of data (Bit_CB) allocated in the processing target code blocks decreases, the amount of uncoded data (Bit_BP) is not changed, and thus it is necessary to decrease the amount of code (Bit_N) in accordance with the total amount of data (Bit_CB).

Figure 13:
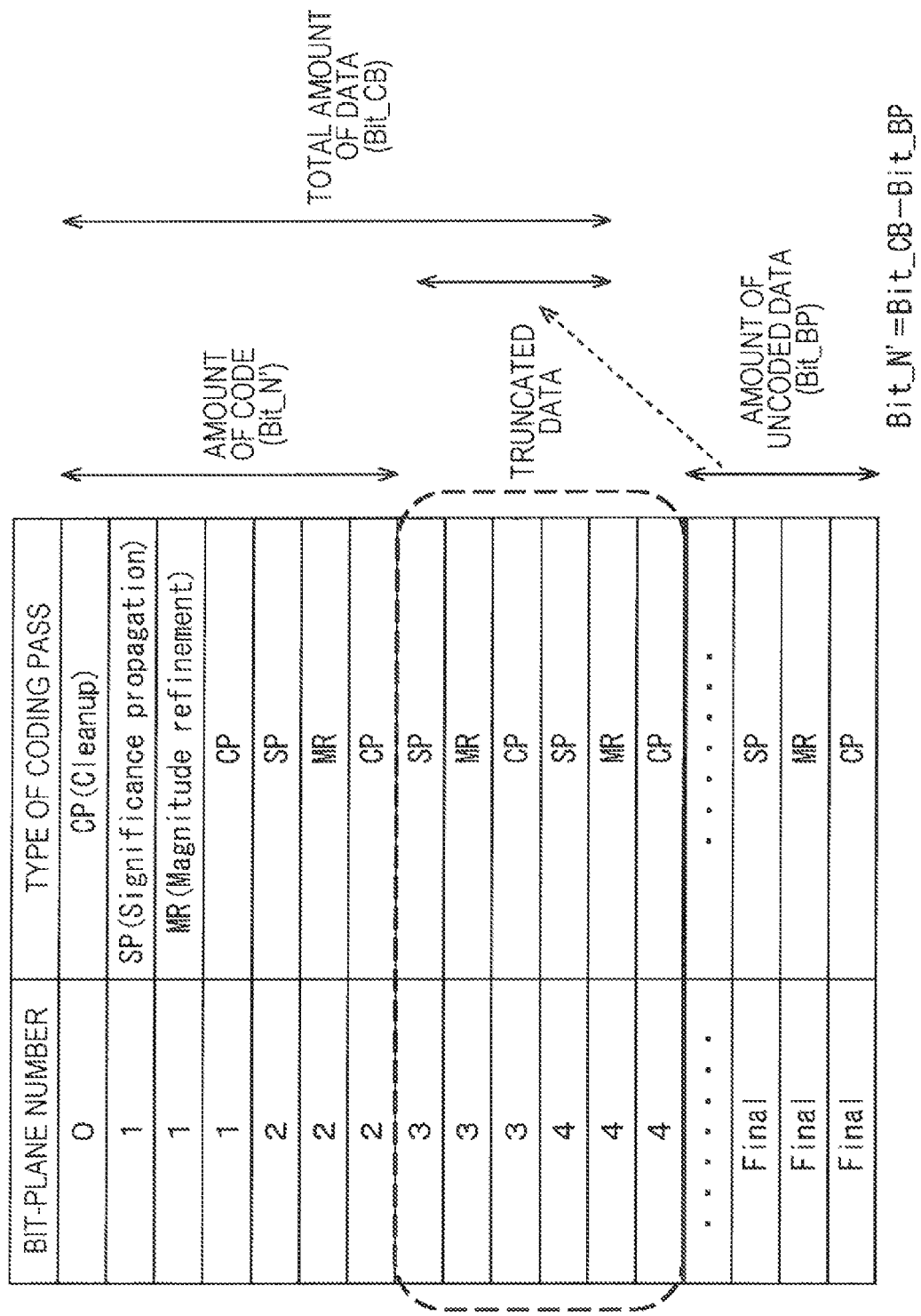
FIG. 13 is a diagram illustrating an example of rate control.

Therefore, as shown in FIG. 13, the rate control section 109 provides a boundary at, for example, the portion of bit-plane number 2 so as not to supply (delete) the subsequent coded data to the synthesizing section 110.

As described above, the rate control section 109 performs the rate control by preferentially deleting the coded data on the lower-level bit side. Thereby, the rate control section 109 does not delete the uncoded data in which there is no information loss, and performs the rate control. Therefore, it is possible to perform the rate control while suppressing deterioration in image quality.

Further, the rate control section 109 easily calculates the target amount of code, and has only to control whether or not to delete the coded data on the basis of the target amount of code, whereby it is possible to easily realize the appropriate rate control.

Furthermore, the rate control section 109 terminates the coding processing for the code block at the time point at which the amount of code reaches a target value. Therefore, it is possible to reduce load thereof. With such a configuration, it is possible to increase the speed of the coding processing and reduce the manufacturing costs.

Flow of Coding Processing

Next, referring to the flowchart of FIG. 14, an example of the flow of the coding processing executed by the encoder 100 will be described. The encoder 100, which codes moving image data, performs the coding processing to be described below on each frame.

When the coding processing is started, the DC-level shift section 101 shifts the DC level of input image data in step S101. In step S102, the wavelet transform section 102 performs wavelet transform on the image data. In step S103, the quantization section 103 quantizes the wavelet coefficient which is obtained through the processing of step S102.

In step S104, the code blocking section 104 divides the wavelet coefficient, which is quantized through the processing of step S103, on a per-code-block basis. In step S105, the bit-plane development section 105 develops the processing target code blocks into bit-planes. In step S106, the uncoded data amount calculation section 106 calculates the amount of uncoded data (Bit_BP) of the processing target code block on the basis of the number of coded bit-planes N.

In step S107, the selection section 107 performs selection processing, thereby classifying each bit-plane into a coding bit-plane and a noncoding bit-plane. In step S108, the coding section 108 performs entropy coding on the coding bit-planes.

In step S109, the rate control section 109 controls the number of coded bit-planes, thereby performing the rate control. In step S110, the synthesizing section 110 synthesizes the coded data subjected to the rate control of step S109 and the uncoded data which is the noncoding bit-plane not coded, thereby generating the code stream.

In step S111, the embedding section 111 embeds the number of coded bit-planes N' after the rate control of step S109 in the code stream.

In step S112, the bit-plane development section 105 determines whether or not all the code blocks are processed. If it is determined that not all the code blocks are processed, the bit-plane development section 105 advances the processing to step S113, shifts the processing target to the subsequent code block, returns the processing to step S105, and repeats the subsequent processing.

If it is determined in seep S112 that all the code blocks are processed by repeatedly executing the processing of steps S105 to S113, the coding processing is terminated.

In addition, the above-mentioned each processing may be executed in an order which is appropriately changed if there is no problem, or may be executed in parallel. For example, in step S105, after the processing target code blocks are developed into bit-planes, each processing of steps S106 to S109 may be executed one bit-plane at a time. Further, for example, when the processing of a certain step for a certain bit-plane is started, in parallel with the processing, processing of the previous step for the subsequent bit-plane may be executed.

Flow of Selection Processing

Next, referring to the flowchart of FIG. 15, an example of the flow of the selection processing performed in step S107 of FIG. 14 will be described.

When the selection processing is started, the coded bit-plane number acquisition portion 131 acquires the number of coded bit-planes N in step S131, and supplies the number to the processing selection portion 132. In step S132, the processing selection portion 132 acquires the processing target bit-plane supplied from the uncoded data amount calculation section 106. The processing selection portion 132 counts the number of bit-planes belonging to the processing target code blocks hitherto acquired.

In step S133, the processing selection portion 132 determines whether or not the number of acquired bit-planes, which are the number of bit-planes hitherto acquired, exceeds the number of coded bit-planes N.

If it is determined that the number of acquired bit-planes is equal to or less than the number of coded bit-planes N, the processing selection portion 132 advances the processing to step S134. In step S134, the processing selection portion 132 supplies the processing target bit-plane as a coding bit-plane to the coding section 108, and codes the bit-plane. When the processing of step S134 is terminated, the processing selection portion 132 advances the processing to step S136.

Further, in step S133, if it is determined that the number of acquired bit-planes exceeds the number of coded bit-planes N, the processing selection portion 132 advances the processing to step S135. In step S135, the processing selection portion 132 supplies the processing target bit-plane as a noncoding bit-plane to the synthesizing section 110, thereby outputting it without coding. When the processing of step S135 is terminated, the processing selection portion 132 advances the processing to step S136.

In step S136, the processing selection portion 132 determines whether or not all the bit-planes of the processing target code block are processed. If an unprocessed bit-plane is present, the processing selection portion 132 returns the processing to step S132, and repeats the subsequent processing. Further, in step S136, if it is determined that all the bit-planes are processed, the processing selection portion 132 terminates the selection processing, returns the processing to step S107 of FIG. 14, and performs the processing in and after step S108.

Rate Control Processing

Figure 16:
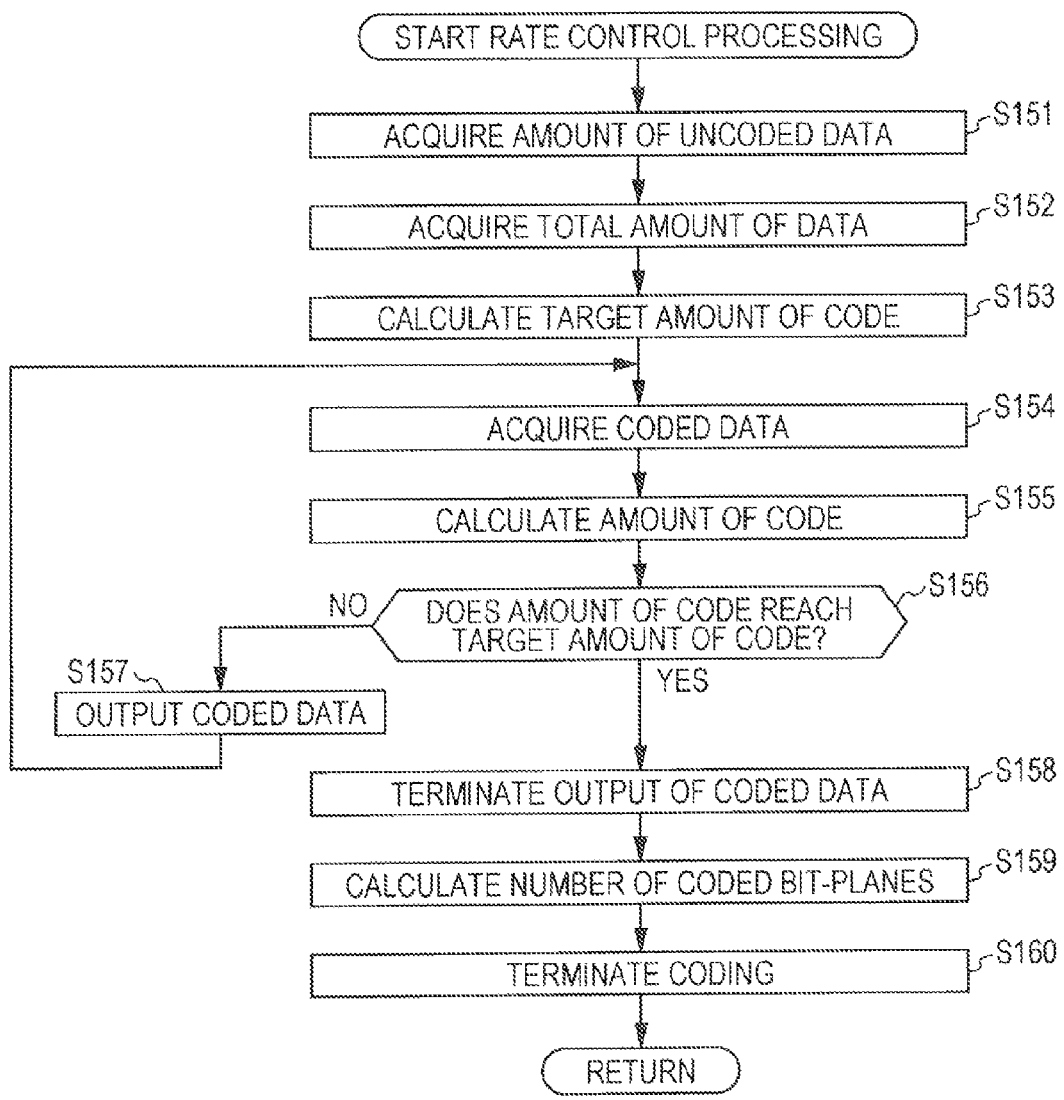
FIG. 16 is a flowchart illustrating an example of a flow of rate control processing.

Next, referring to the flowchart of FIG. 16, an example of the flow of the rate control processing performed in step S109 of FIG. 14 will be described.

When the rate control processing is started, in step S151, the target code amount calculation portion 153 acquires the amount of uncoded data (Bit_BP) which is calculated by the uncoded data amount calculation section 106. In step S152, the total data amount acquisition portion 152 acquires the total amount of data (Bit_CB) which is allocated in the processing target code block.

In step S153, the target code amount calculation portion 153 calculates the target amount of code (Bit_N') by subtracting the amount of uncoded data (Bit_BP) acquired in step S151 from the total amount of data (Bit_CB) acquired in step S152.

In step S154, the code amount calculation portion 151 acquires the coded data supplied from the coding section 108. In step S155, the code amount calculation portion 151 calculates the amount of code of the coded data (the accumulated value thereof) (Bit_N) in step S154.

In step S156, the output control portion 154 determines whether or not the amount of code (Bit_N) calculated in step S155 reaches the target amount of code (Bit_N') calculated in step S153. If it is determined that the amount of code (Bit_N) is smaller than the target amount of code (Bit_N'), the output control portion 154 advances the processing to step S157.

In step S157, the output control portion 154 outputs the current coded data, which is acquired in step S154, to the synthesizing section 110, returns the processing to step S154, and repeats the subsequent processing.

Further, in step S156, if the amount of code (Bit_N) is equal to or greater than the target amount of code (Bit_N'), the output control portion 154 advances the processing to step S158. In step S158, the output control portion 154 terminates the output of the coded data. More specifically, if the amount of code (Bit_N) coincides with the target amount of code (Bit_N'), the output control portion 154 outputs the current coded data, which is acquired in step S154, to the synthesizing section 110, and then stops outputting the subsequent coded data (the coded data corresponding to the lower-level-bit-side bit-planes). Further, if the amount of code (Bit_N) is larger than the target amount of code (Bit_N'), the output control portion 154 destroys the current coded data which is acquired in step S154, and stops outputting the subsequent coded data (the coded data corresponding to the lower-level-bit-side bit-planes).

In step S159, the output control portion 154 calculates the number of coded bit-planes N' as the number of bit-planes of the processing target code blocks which are hitherto output. The output control portion 154 supplies the calculated number of coded bit-planes N' to the embedding section 111.

In step S160, the output control portion 154 controls the coding section 108 so as to thereby terminate the coding. When the processing of step S160 is terminated, the output control portion 154 terminates the rate control processing, returns the processing to step S109 of FIG. 14, and executes the processing in and after step S110.

Example of Encoding Result

Figure 17:
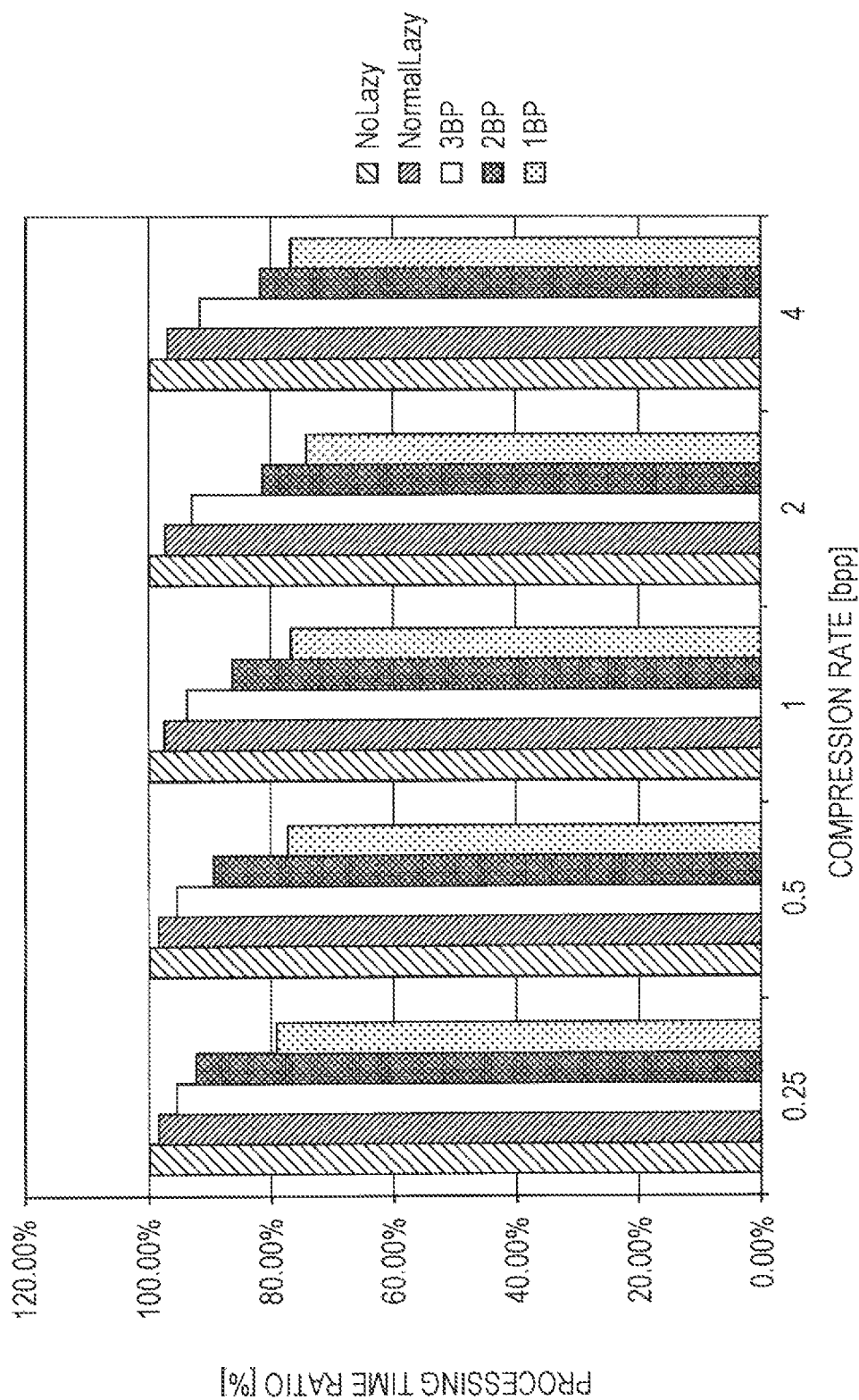
FIG. 17 is a diagram illustrating an example of a relationship between the compression rate and the processing speed.

Next, referring to FIGS. 17 and 18, a description will be given of the processing time and image quality at the time of performing coding through the above-mentioned encoder 100. FIG. 17 is a diagram illustrating the speed difference caused by the difference in the number of coded data pieces remaining in the rate control processing of the rate control section 109.

In addition, here, it is assumed that the number of coded bit-planes N=4. That is, the selection section 107 sets coded data by coding the bit-planes ranging up to the fourth level, and sets uncoded data by uncoding the bit-planes lower than the fifth level.

In FIG. 17, the lengths of the entire processing times of the encoder 100 in the following five cases are compared. The first case is a case (No Lazy) where all the bit-planes of the processing target code block are coded. The second case is a case (Normal Lazy) where all the coding bit-planes of the processing target code block are coded (the bit-planes with levels higher than the fourth (BP=4) level are coded). The third case is a case (3 BP) where the coding is performed up to the third coding bit-plane of the processing target code block (the bit-planes with levels higher than the third (BP=3) level are coded). The fourth case is a case (2 BP) where the coding is performed up to the second coding bit-plane of the processing target code block (the bit-planes with levels higher than the second (BP=2) level are coded). The fifth case is a case (1 BP) where only the first coding bit-plane of the processing target code block is coded (only the MSB bit-plane is coded).

In the example of FIG. 17, the lengths of the processing times of the respective cases are illustrated when the case of "No Lazy" is set as a reference. Further, in the example of FIG. 17, the comparison is performed in the following five cases: the compression rate is 0.25 bpp; 0.5 bpp; 1.0 bpp; 2.0 bpp; and 4.0 bpp.

As shown in FIG. 17, even at any compression rate, in the case where only the highest-level bit-plane of the processing target code block is coded (in the case of 1 BP), the processing time is shortest. That is, as the number of bit-planes decreases, the processing time of the encoder 100 decreases regardless of the compression rate. For example, when the processing time of No Lazy is set to 100%, the processing time of Normal Lazy is about 95%, and the processing time at BP=1 is about 75%. Accordingly, as compared with Normal Lazy prescribed by JPEG 2000, there is an advantage in that the processing time can be reduced by about 20%.

That is, the rate control section 109 is able to reduce the processing time of the coding processing by performing the rate control as described above.

Figure 18:
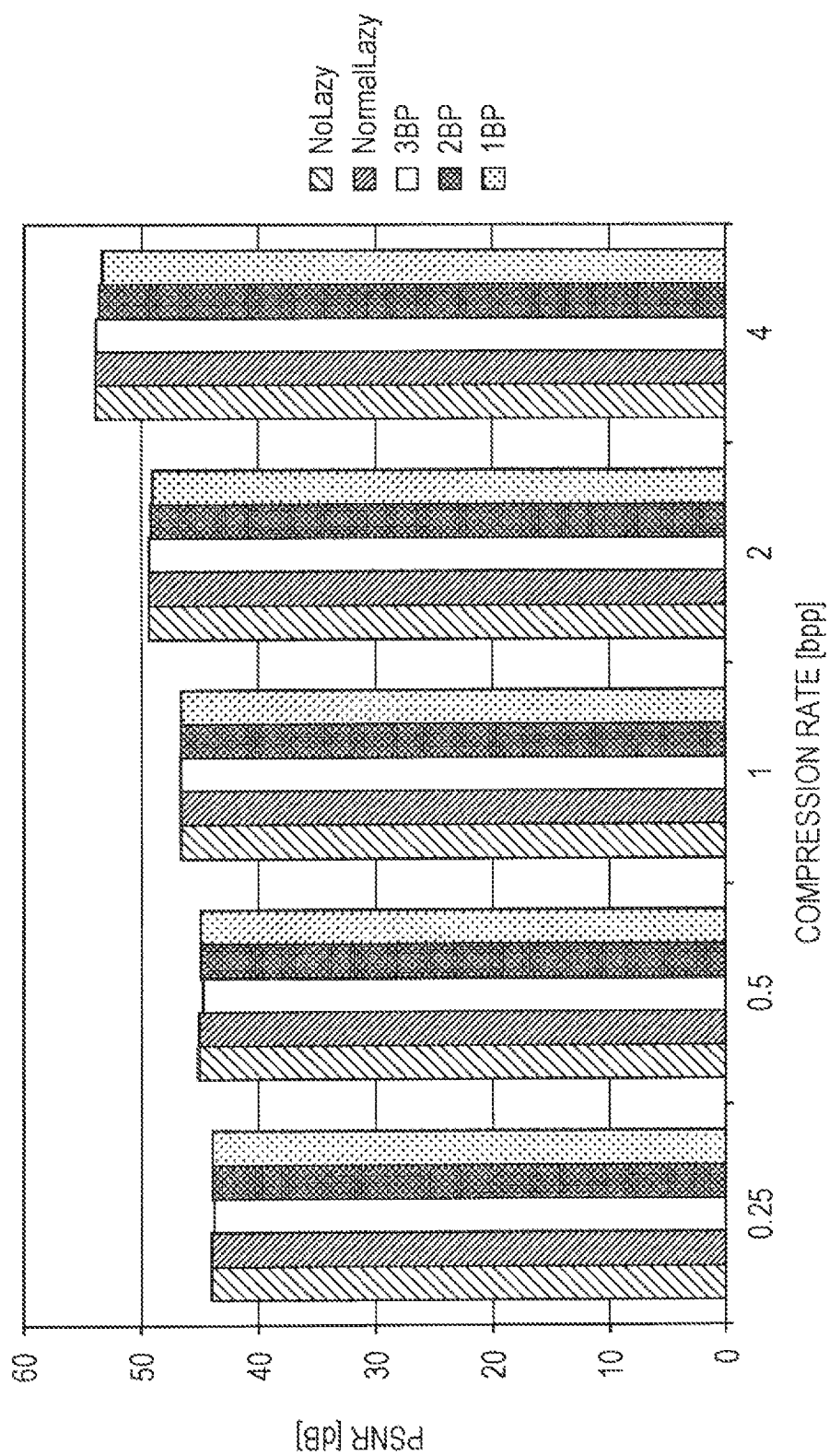
FIG. 18 is a diagram illustrating an example of a relationship between the compression rate and the image quality.

FIG. 18 is a diagram illustrating the difference in image quality caused by the difference in the number of coded data pieces remaining in the rate control processing of the rate control section 109.

In addition, also in FIG. 18, similarly to the case of FIG. 17, it is assumed that the number of coded bit-planes N=4. Under the assumption, in the five cases of No Lazy, Normal Lazy, 3 BP, 2 BP, and 1 BP, the image qualities (PSNR (Peak Signal-to-Noise Ratio)) of the images, which are obtained by decoding the coded data generated by the encoder 100, are compared.

As shown in FIG. 18, at any compression rate, there are no large differences in PSNR. That is, the rate control section 109 is able to suppress deterioration in image quality by performing the rate control as described above.

That is, the encoder 100 is able to appropriately perform the rate control while suppressing an increase in processing time and deterioration in image quality. Accordingly, since the encoder 100 appropriately performs the rate control even in the case of lossy coding, it is possible to reduce the load thereof.

2. Second Embodiment

Exemplary Configuration of Decoder

Figure 19:
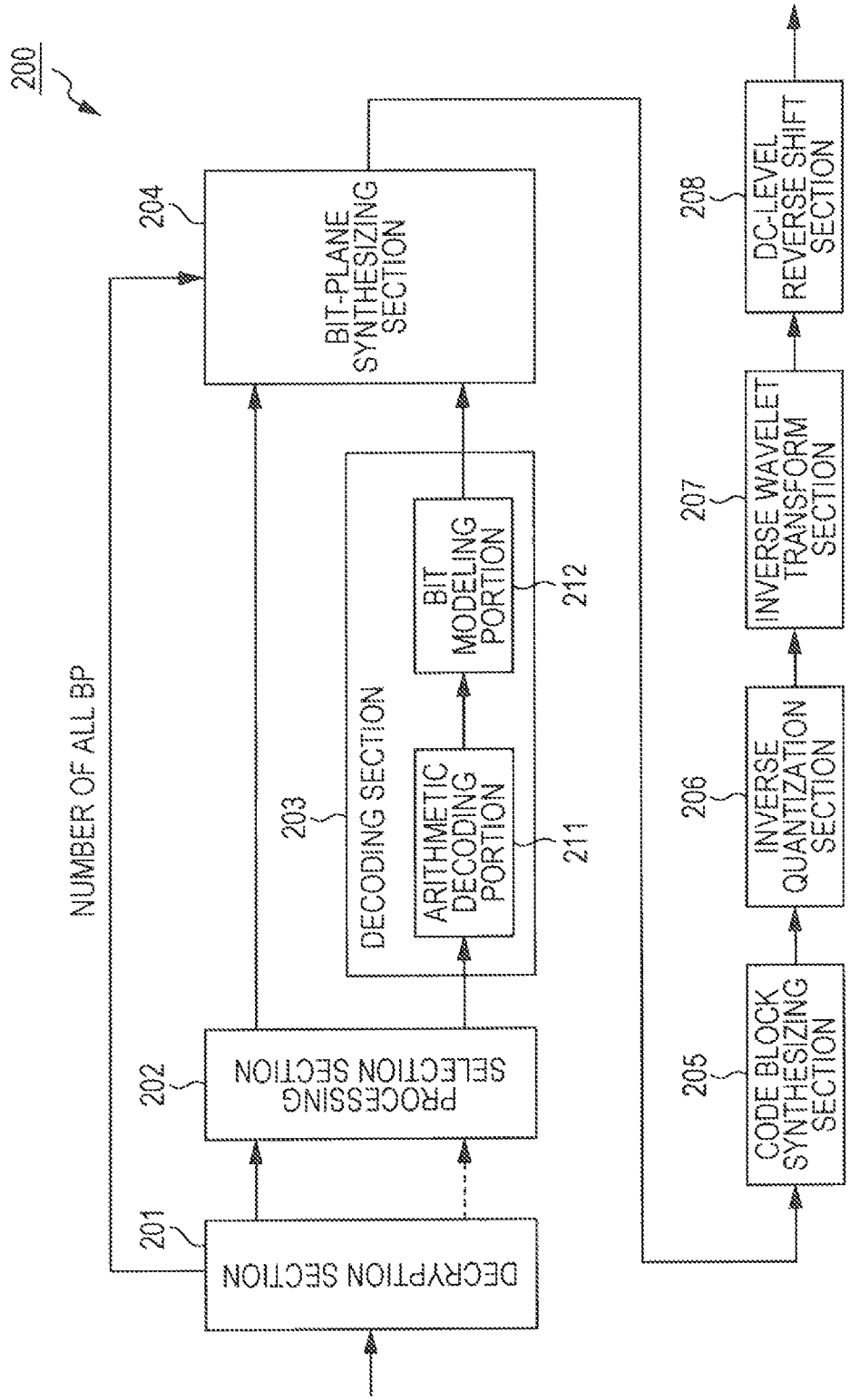
FIG. 19 is a block diagram illustrating an example of a principal configuration of a decoder.

Next, a decoder (decoding apparatus) corresponding to the above-mentioned encoder 100 will be described. FIG. 19 is a block diagram illustrating an example of a configuration of a decoder.

The decoder 200 shown in FIG. 19 is a decoding apparatus that decodes the code stream supplied from the encoder 100 by using a decoding method corresponding to the coding method of the encoder 100 so as to thereby obtain the decoded image data.

The decoder 200 decrypts the code stream which is the supplied from the encoder 100, and specifies a bit-plane for switching selection between compression data and non-compression data in the encoder 100, thereby decoding respective bit-planes in accordance with the selection of the encoder 100. That is, the decoder 200 decodes the bit-planes, which are coded by the encoder 100, by using the decoding method corresponding to the coding method of the encoder 100, and uses the bit-planes which are not coded by the encoder 100, as they are, without decoding them. Consequently, the decoder 200 appropriately decodes and synthesizes the respective bit-planes, thereby generating the image data of the baseband (thereby obtaining the decoded image data).

In addition, in the above description, the encoder 100 packetizes the code stream, and outputs the code stream. Accordingly, when the output of the encoder 100 is decoded, in practice, packet analysis processing of extracting the code stream by analyzing the packets is necessary. However, in the following description, it is assumed that the packet analysis processing can be performed by an optional method, and thus a description of the packet analysis processing will be omitted for convenience of description.

As shown in FIG. 19, the decoder 200 has a decryption section 201, a processing selection section 202, a decoding section 203, a bit-plane synthesizing section 204, a code block synthesizing section 205, an inverse quantization section 206, an inverse wavelet transform section 207, and a DC-level reverse shift section 208.

The decryption section 201 decrypts the supplied code stream. For example, the decryption section 201 extracts information which represents the number of coded bit-planes N' embedded in the code stream in the encoder 100, and determines whether or not the processing target bit-plane is coded, on the basis of the information.

More specifically, for example, the decryption section 501 decrypts the code stream in accordance with the syntax of JPEG 2000, and higher 2 bits of the SPcod or SPcoc shown in FIG. 7, and extracts the information which represents the number of coded bit-planes N'. Further, the decryption section 201 supplies the data of each bit-plane included in the code stream to the processing selection section 202. At this time, the decryption section 201 notifies the processing selection section 202 of whether the supplied data is coded data or uncoded data on the basis of the extracted number of coded bit-planes N'.

For example, when supplying the processing selection section 202 with data of the bit-planes ranging from the head of the code stream to N'-th bit-plane where N' is the number of coded bit-planes, the decryption section 201 notifies the processing selection section 202 that the data is coded data. Further, when supplying data of the (N'+1)th and following bit-planes to the processing selection section 202, the decryption section 201 notifies the processing selection section 202 that the data is uncoded data.

Further, the decryption section 501 extracts information, which represents the total number of bit-planes (the total number of BPs) of each code block included in the code stream, and supplies the information to the bit-plane synthesizing section 204. In addition, since the total number of BPs is determined in advance, the bit-plane synthesizing section 204 may retain the information in advance. In this case, the supply of the total number of BPs is omitted.

As described above, the processing selection section 202 acquires data of each bit-plane from the decryption section in a state it is possible to identify whether the data is coded data or uncoded data. Then, the processing selection section 202 supplies the coded data, which is supplied from the decryption section 201, to the decoding section 203. Further, the processing selection section 202 supplies the uncoded data (bit-planes), which is supplied from the decryption section 201, to the bit-plane synthesizing section 204.

The decoding section 203 decodes the coded data of each bit-plane by using the decoding method corresponding to the coding of the encoder 100, and supplies the decoding result (uncoded data, that is, bit-plane) to the bit-plane synthesizing section 204.

In the case of the example of FIG. 19, the decoding section 203 has an arithmetic decoding portion 211 and a bit modeling portion 212. The arithmetic decoding portion 211 decodes the coded data, and the bit modeling portion 212 generates wavelet coefficients developed into bit-planes.

When acquiring the respective bit-planes (uncoded data) from the decoding section 203 and the processing selection section 202, the bit-plane synthesizing section 204 generates the coefficient data on a per-code-block basis by synthesizing the bit-planes.

However, as described above, when some bit-planes are deleted by the rate control in the encoder 100 (in a case of N>N'), the number of bit-planes is not sufficient at the time of synthesizing the bit-planes. That is, when the number of bit-planes supplied to the bit-plane synthesizing section 204 is smaller than the total number of BPs, the bit-planes are deleted in the rate control of the encoder 100 by an amount of the difference therebetween.

The bit-plane synthesizing section 204 counts the number of bit-planes, which are supplied from the processing selection section 202 and the decoding section 203, in the processing target code block. Then, the bit-plane synthesizing section 204 calculates a difference value between the total number of BPs supplied from the decryption section 201 and the count value of the bit-planes corresponding to the single code block.

The bit-plane synthesizing section 204 generates bit-planes of which all the coefficient values are zero by an amount of the difference, and synthesizes the uncoiled data which is supplied from the processing selection section 202 and the decoding section 203.

More specifically, the bit-planes, which are supplied from the decoding section 203, are MSB to N'-th-level bit-planes, and the bit-planes, which are supplied from the processing selection section 202, are (N+1)th-level to LSB bit-planes. Accordingly, the levels therebetween, that is, (N'+1)th to N-th levels are levels of blanks in which the bit-planes not allocatable. The bit-plane synthesizing section 204 inserts the generated bit-planes, of which all the coefficient values are zero, to the levels of the blanks.

That is, in the direction from the MSB to the LSB, the bit-planes which are supplied from the decoding section 203, the bit-planes of which all the coefficient values are zero, and the bit-planes which are supplied from the processing selection section 202 are sorted to be arranged in this order and synthesized, thereby generating the coefficient data of the code block unit.

The code block synthesizing section 205 synthesizes the coefficient data of the code block unit generated in such a manner, and generates the coefficient data corresponding to a single picture. The coefficient data is quantized in the quantization section 103. The code block synthesizing section 205 supplies the coefficient data to the inverse quantization section 206.

The inverse quantization section 206 performs inverse quantization on the coefficient data by using a method compatible with the quantization section 103, and supplies the coefficient data after the inverse quantization to the inverse wavelet transform section 207.

The inverse wavelet transform section 207 performs inverse wavelet transform on the supplied wavelet coefficient, and generates image data of the baseband. The DC-level reverse shift section 208 performs DC-level reverse shift processing of recovering the DC component of the image data to its original state by an amount of the shift at the time of coding as necessary. The DC-level reverse shift section 208 outputs the image data after the DC-level reverse shift processing.

As described above, the decoder 200 appropriately decodes the code stream including the bit-planes which are generated by the encoder 100 and are not subjected to coding, whereby it is possible to obtain the decoded image data. Further, in this case, as compared with the case where the decoder 200 decodes the code stream in which all the normal bit-planes are coded (the case of decoding all the bit-planes), it is possible to reduce processing load of the decoding processing.

Bit-Plane Synthesizing Section

Figure 20:
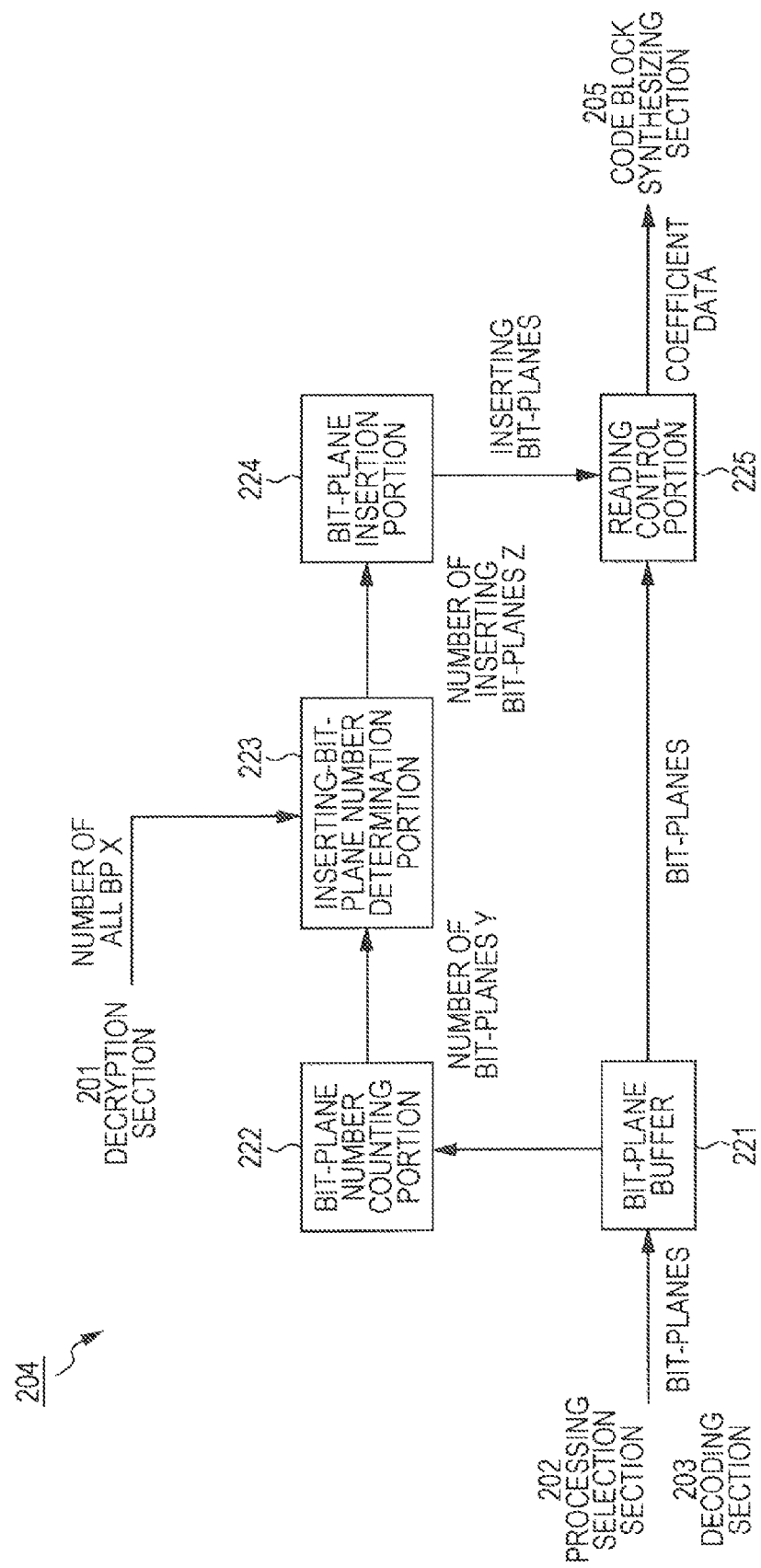
FIG. 20 is a block diagram illustrating an example of a principal configuration of the bit-plane synthesizing section of FIG. 19.

FIG. 20 is a block diagram illustrating an example of a principal configuration of the bit-plane synthesizing section 204 of FIG. 19. As shown in FIG. 20, the bit-plane synthesizing section 204 has a bit-plane buffer 221, a bit-plane number counting portion 222, an inserting-bit-plane number determination portion 223, a bit-plane insertion portion 224, and a reading control portion 225.

The bit-plane buffer 221 stores the bit-planes which are supplied from the processing selection section 202 and the decoding section 203. The bit-plane number counting portion 222 counts the number of bit-planes stored in the bit-plane buffer 221, and notifies the count value Y (the number of bit-planes Y) to the inserting-bit-plane number determination portion 223.

The inserting-bit-plane number determination portion 223 acquires the total number of BPs X (the number of bit-planes of a single code block) supplied from the decryption section 201. Further, the inserting-bit-plane number determination portion 223 acquires the number of bit-planes Y from the bit-plane number counting portion 222.

The inserting-bit-plane number determination portion 223 determines the number of inserting bit-planes Z as the number of bit-planes, which are inserted when the bit-planes are synthesized, on the basis of the above-mentioned values. More specifically, the inserting-bit-plane number determination portion 223 calculates the number of inserting bit-planes Z by subtracting the number of bit-planes Y from the total number of BPs X as represented by the following Expression (2).

$$Z=X-Y \quad (2)$$

The inserting-bit-plane number determination portion 223 notifies the number of inserting bit-planes Z to the bit-plane insertion portion 224.

The bit-plane insertion portion 224 generates the bit-planes (inserting bit-planes), of which all the coefficients are zero, by the number of supplied inserting bit-planes Z, reads the inserting bit-planes, supplies them to the control portion 225, and inserts them to a bit-plane group which is synthesized in the reading control portion 225.

The reading control portion 225 reads the bit-planes, which are stored in the bit-plane buffer 221, in order from the MSB to the LSB. More specifically, the reading control portion 225 first reads the respective bit-planes supplied from the decoding section 203 in order from the MSB to the lower-level bit side, and then reads the respective bit-planes, which are supplied from the processing selection section 202, in order from the higher-level bit side to the LSB.

Further, the reading control portion 225 acquires the inserting bit-planes of the number of bit-planes Z supplied from the bit-plane insertion portion 224, and inserts them to the levels between the bit-planes supplied from the decoding section 203 and the bit-planes supplied from the processing selection section 202. That is, the reading control portion 225 sorts the bit-planes so as to arrange the bit-planes supplied form the decoding section 203, the inserting bit-planes, and the bit-planes supplied from the processing selection section 202 in this order in the direction from the MSB to the LSB.

The inserting bit-planes of the number of bit-planes Z are inserted; whereby the number of bit-planes retained by the reading control portion 225 becomes equal to the total number of BPs X. By synthesizing the bit-planes in this order, the reading control portion 225 generates the coefficient data corresponding to a single code block. The reading control portion 225 supplies the generated coefficient data corresponding to a single code block to the code block synthesizing section 205.

As described above, the bit-plane synthesizing section 204 is able to easily find a deficiency (the number of bit-planes deleted in the encoder 100) of the number of bit-planes, and is able to easily generate and insert the inserting bit-planes corresponding to the deficiency. That is, as described above, even when the rate control is performed by deleting the bit-planes, the bit-plane synthesizing section 204 easily generates the coefficient data corresponding to a single code block.

Flow of Decoding Processing

Referring to the flowchart of FIG. 21, an example of the flow of the decoding processing executed by the decoder 200 of FIG. 19 will be described.

When acquiring the code stream generated by the encoder 100, the decoder 200 starts the decoding processing. In addition, the decoder 200 repeatedly performs the decoding processing to be described below on a per-picture basis.

When the decoding processing is started, the decryption section 201 of the decoder 200 decrypts the supplied code stream in step S201. In step S202, the processing selection section 202 determines whether or not the processing target bit-plane is coded on the basis of the decryption result. If it is determined that the processing target bit-plane is coded, that is, the data of the processing target bit-plane is coded data, the processing selection section 202 advances the processing to step S203.

In step S203, the decoding section 203 performs entropy decoding on the processing target coded data, and advances the processing to step S204. Further, in step S202, if it is determined that the processing target bit-plane is not coded, that is, the data of the processing target bit-plane is uncoded data, the processing selection section 202 advances the processing to step S204.

In step S204, the processing selection section 202 determines whether or not all the bit-planes in the processing target code block are processed. If it is determined that an unprocessed bit-plane is present, the processing selection section 202 returns the processing to step S201, changes the processing target to the subsequent bit-plane, and repeats the subsequent processing.

If it is determined in step S204 that all the bit-planes in the processing target code block are processed by repeatedly executing each processing of steps S201 to S204, the processing selection section 202 advances the processing to step S205. In step S205, the bit-plane synthesizing section 204 synthesizes the respective bit-planes, and generates a wavelet coefficient of the code block unit.

In step S206, the bit-plane synthesizing section 204 determines whether or not all the code blocks are processed. If it is determined that an unprocessed code block is present, the bit-plane synthesizing section 204 returns the processing to step S201, changes the processing target to the subsequent code block, changes the processing target to the subsequent code block, and repeats the subsequent processing.

If it is determined in step S206 that all the code blocks are processed by repeatedly executing each processing of steps S201 to S206, the code block synthesizing section 205 advances the processing to step S207. In step S207, the code block synthesizing section 205 synthesizes the wavelet coefficients of the respective code blocks.

The wavelet coefficients corresponding to a single picture as the synthesis result are quantized in the encoder 100. In step S208, the inverse quantization section 206 performs inverse quantization on the respective quantized wavelet coefficients by using a method compatible with the quantization section 103 of the encoder 100.

In step S209, the inverse wavelet transform section 207 performs inverse wavelet transform processing on the wavelet coefficients corresponding to a single picture subjected to the inverse quantization through the processing of step S208, thereby generating the image data (decoded image data) of the baseband corresponding to the single picture.

In step S210, the DC-level reverse shift section 208 shifts the DC level by the shift amount of the encoder 100, in a direction opposite to the shift direction of the encoder 100, and terminates the decoding processing.

Flow of Bit-Plane Synthesis Processing

Next, referring to the flowchart of FIG. 22, an example of the flow of bit-plane synthesis processing executed in step S205 of FIG. 21 will be described.

When the bit-plane synthesis processing is started, the inserting-bit-plane number determination portion 223 of the bit-plane synthesizing section 204 of FIG. 20 acquires the total number of bit-planes X in step S231.

In step S232, the bit-plane buffer 221 acquires and stores the bit-planes, which are obtained through the decoding of the decoding section 203, or the bit-planes which are supplied from the processing selection section 202.

In step S233, the bit-plane buffer 221 determines whether or not all the bit-planes of the processing target code block is stored, and determines whether or not an unprocessed code block is present. If it is determined that an unprocessed code block is present, the processing advances to step S232, and the subsequent processing is repeated.

If it is determined in step S233 that all the bit-planes of the processing target code block are processed by repeatedly executing the processing of steps S232 and S233, the bit-plane buffer 221 advances to the processing to step S234.

As described above, the bit-plane buffer 221 sequentially stores the bit-planes which are supplied from the processing selection section 202 and the decoding section 203, and retains the bit-planes corresponding to a single code block. That is, in practice, the processing of steps S232 and S233 is performed to correspond to the processing of steps S202 and S203 of FIG. 21. Consequently, iteration of steps S232 and S233 is performed in parallel with the iteration of steps S202 and S203 of FIG. 21.

In step S234, the bit-plane number counting portion 222 counts the number of bit-planes (the number of bit-planes Y) accumulated in the bit-plane buffer 221. In addition, the processing may be performed to correspond to the processing of step S232. That is, after all the bit-planes of the processing target code block are stored in the bit-plane buffer 221, the number of bit-planes accumulated in the bit-plane buffer 221 may be counted. Alternatively, when the bit-plane buffer 221 stores the bit-planes, the number of times the bit-plane is stored may be counted.

In step S235, the inserting-bit-plane number determination portion 223 calculates the number of inserting bit-planes Z on the basis of the total number of bit-planes (the total number of BPs) X acquired in step S231 and the number of bit-planes Y obtained in step S234, as represented by the following Expression (3).

$$Z = X - Y \qquad (3)$$

That is, when the number of current bit-planes Y is insufficient for the total number of BPs X as the number of bit-planes at the time of the development in the encoder 100, the bit-planes corresponding to the deficiency are inserted. In step S236, the bit-plane insertion portion 224 generates the inserting bit-plane, of which all the coefficients are zero, by the number of inserting bit-planes Z.

In step S237, the reading control portion 225 reads the bit-planes from the bit-plane buffer 221. The reading control portion 225, first, reads the respective bit-planes supplied from the decoding section 203 in order from the MSB to the lower-level bit side, and then reads the respective bit-planes, which are supplied from the processing selection section 202, in order from the higher-level bit side to the LSB.

In step S238, the reading control portion 225 inserts the inserting bit-planes of the number of bit-planes Z, which are supplied from the bit-plane insertion portion 224, to the levels between the bit-planes supplied from the decoding section 203 and the bit-planes supplied from the processing selection section 202.

Figure 21:
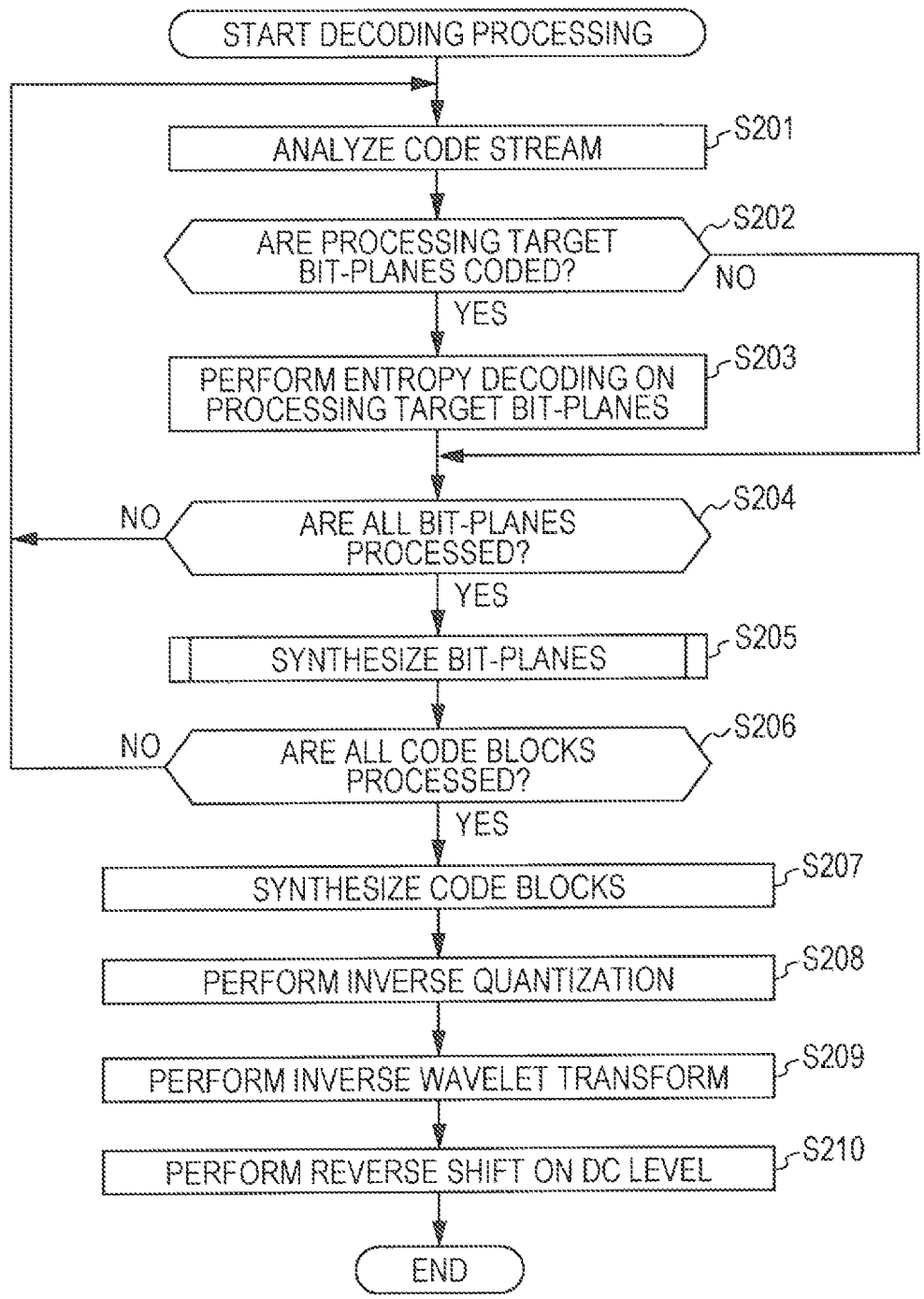
FIG. 21 is a flowchart illustrating an example of a flow of decoding processing.
Figure 22:
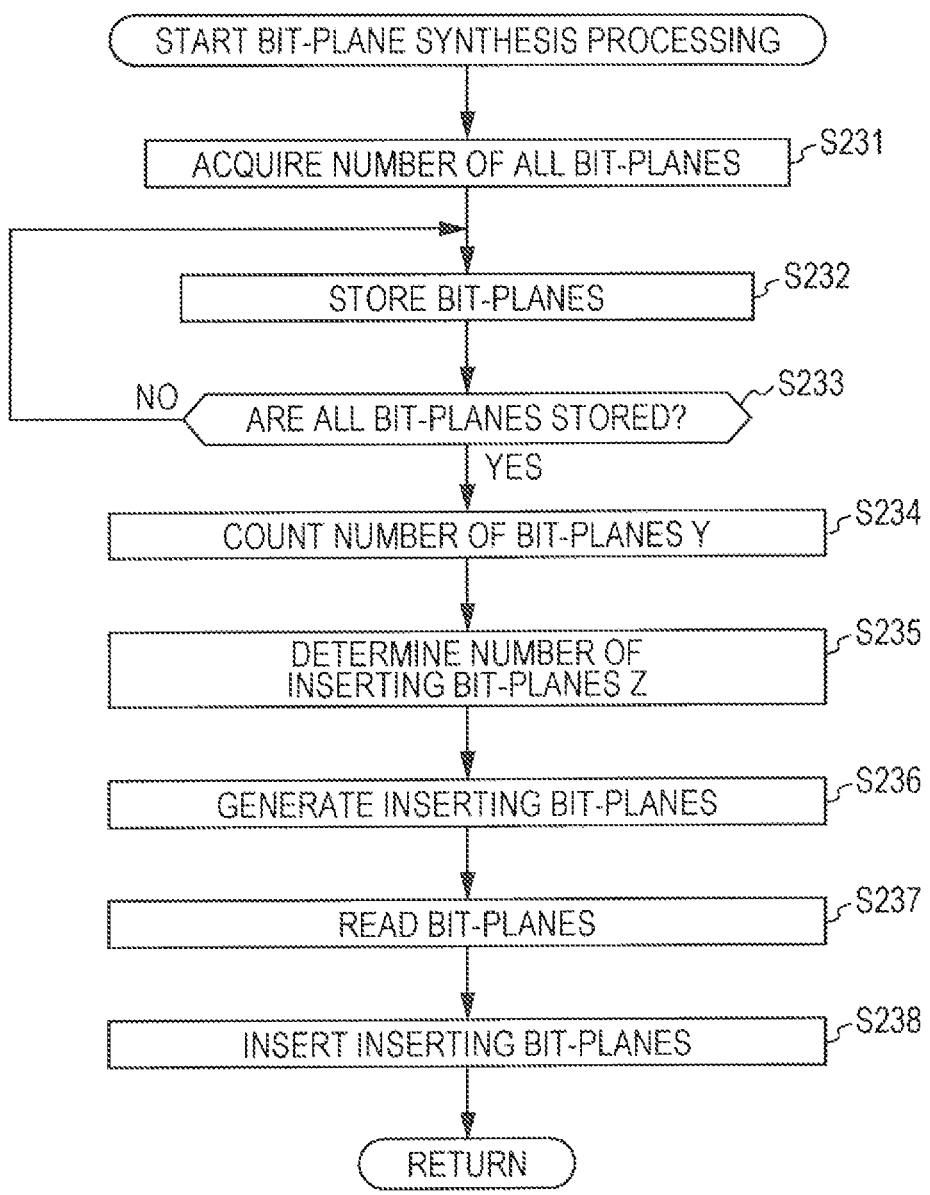
FIG. 22 is a flowchart illustrating an example of a flow of bit-plane synthesis processing.

When the processing of step S238 is terminated, the reading control portion 225 supplies the coefficient data corresponding to a single code block generated in such a manner to the code block synthesizing section 205, terminates the bit-plane synthesis processing, returns the processing to step S205 of FIG. 21, and performs the processing in and after step S206.

As described above, by executing each processing, the decoder 200 appropriately decodes the code stream including the bit-planes which are generated by the encoder 100 and are not subjected to coding, whereby it is possible to obtain the decoded image data.

3. Third Embodiment

Exemplary Configuration of Encoder

In addition, the above-mentioned first embodiment describes, as the rate control method, the method in which the amounts of code of the coded data obtained by coding are accumulated and the coding is terminated at the time point at which the amount of code reaches the target amount of code. However, the rate control method is not limited to this. For example, after all the bit-planes selected as the coding bit-planes in the selection section are coded, the bit-planes of which the amount of code exceeds the target amount of code may be destroyed.

Figure 23:
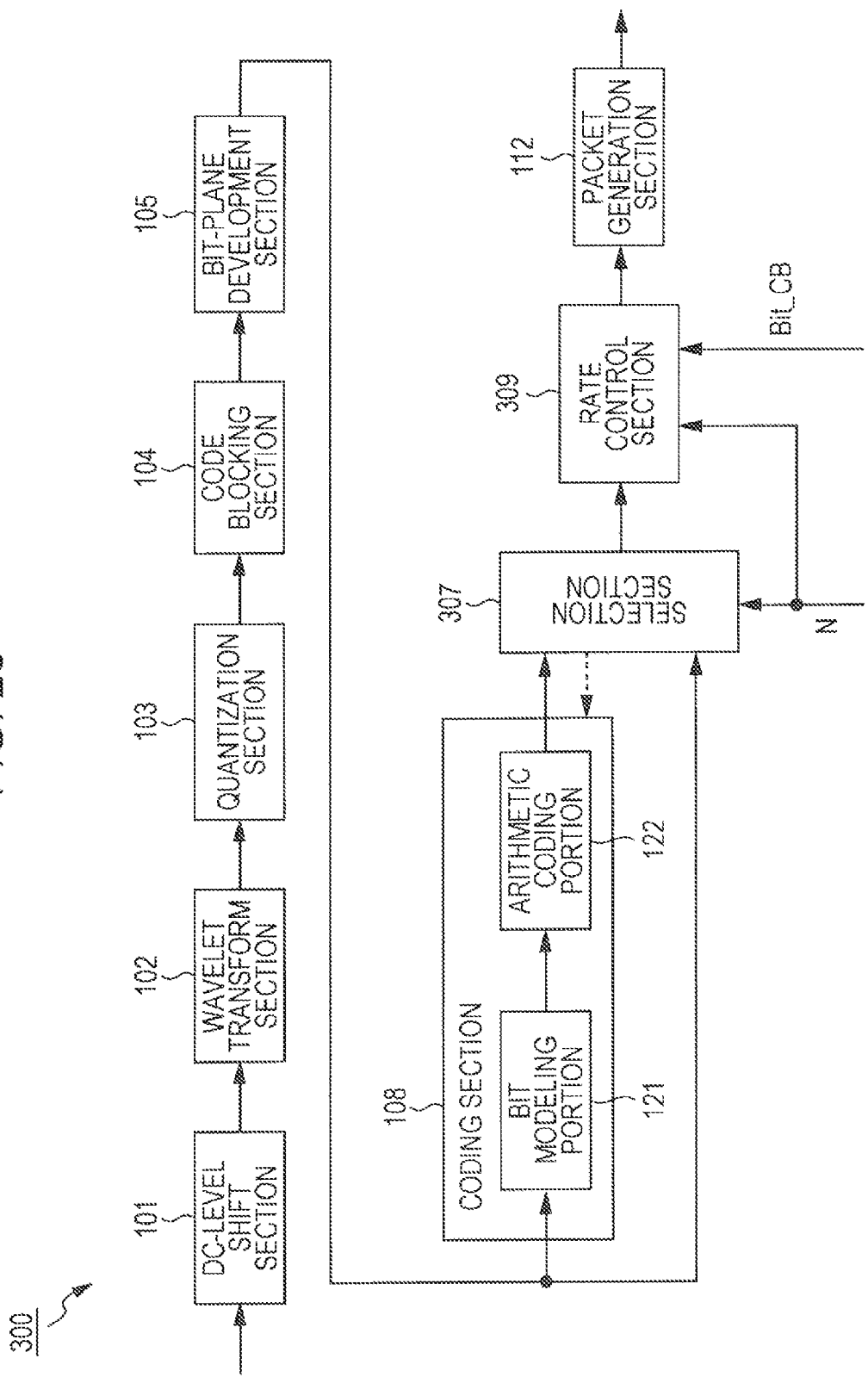
FIG. 23 is a block diagram illustrating another example of the encoder.

The exemplary configuration of the encoder in this case is shown in FIG. 23. The encoder 300 shown in FIG. 23 is, similarly to the encoder 100 of FIG. 1, a coding apparatus that performs lossy coding on the image data.

The encoder 300 basically has the same configuration as the encoder 100. However, as described above, before the rate control, the encoder 300 selects processing of coding or processing of noncoding all the bit-planes of the processing target code block, and codes all the bit-planes to be coded.

Accordingly, the encoder 300 has a selection section 307 instead of the selection section 107 of the encoder 100, and has a rate control section 309 instead of the rate control section 109. In addition, the uncoded data amount calculation section 106, the synthesizing section 110, and the embedding section 111 of the encoder 100 are omitted.

In the case of the encoder 300, the respective bit-planes, which are developed by the bit-plane development section 105, are supplied to the coding section 108 and the selection section 307 in order from the MSB to the LSB. Under the control of the selection section 307, the coding section 108 codes the respective supplied coding bit-planes, and supplies the generated coded data to the selection section 307.

The selection section 307 acquires the number of coded bit-planes N, similarly to the selection section 107. The selection section 307 selects the data, which is supplied to the rate control section 309, for each bit-plane by using the number of coded bit-planes N.

More specifically, the selection section 307 selects the coded data, which is supplied from the coding section 108, at the levels higher than the N-th level, and supplies the coded data to the rate control section 309. The selection section 307 selects the bit-planes (uncoded data), which are supplied from the bit-plane development section 105 at the levels lower than the (N+1)th level, and supplies them to the rate control section 309.

In addition, at the levels at which the uncoded data is selected, coding performed by the coding section 108 is not necessary. The selection section 307 performs the selection on the N-th-level bit-plane, and then instructs the coding section 108 to terminate coding. The coding section 108 codes only the bit-planes higher than the N-th level in accordance with the control, and omits coding for the bit-planes with levels lower than the (N+1)th level.

Accordingly, the coding section 108 is able to omit coding processing unnecessary for the bit-planes which are selected by the selection section 307. That is, the selection section 307 is able to suppress an increase in unnecessary load.

As described above, the selection section 307 selects the uncoded data at the levels lower than the (N+1)th level after the stop of the coding, and supplies the data to the rate control section 309. As described above, in the rate control section 309, the coded data or uncoded data is supplied at all the levels of the bit depth of the processing target code block. The rate control section 309 retains the coded data and uncoded data.

The rate control section 309 acquires the number of coded bit-planes N similarly to the selection section 307. Further, similarly to the rate control section 109, the rate control section 309 acquires the total amount of data (Bit_CB) allocated in the processing target code block. The rate control section 309 performs the rate control on the basis of the information.

The rate control method is basically the same as that of the rate control section 109. The rate control section 309 deletes the coded data, which is supplied from the selection section 307, as necessary so as to achieve the target amount of code by calculating the target amount of code of the output coded data. At this time, the rate control section 309 preferentially deletes the coded data on the lower-level bit side. Further, the rate control section 309 does not delete the uncoded data.

In addition, at the time of the rate control, the rate control section 309 also calculates the amount of uncoded data, generates the code stream, and embeds the code stream of the number of coded bit-planes N'.

After the rate control, the rate control section 309 supplies the higher-level bit side coded data and the uncoded data, which are not deleted, to the packet generation section 112.

Accordingly, the rate control section 309 appropriately performs the control (rate control) of the amount of code of the code stream while suppressing deterioration in image quality or an increase in load. As a result, the encoder 300 is able to reduce the load even in the lossy coding, similarly to the case of the encoder 100.

In addition, in the case of the encoder 300, as described above, all the coding bit-planes before the rate control are coded. Accordingly, the load increases as compared with the case of the encoder 100 that codes only the bit-planes included in the code stream, but the encoder 300 can be easily applied to various other systems.

For example, by omitting the quantization processing, as long as the coded data and the uncoded data (output of the selection section 307) before the rate control are output, the encoder 300 is compatible with the lossless coding system.

Selection Section

Figure 24:
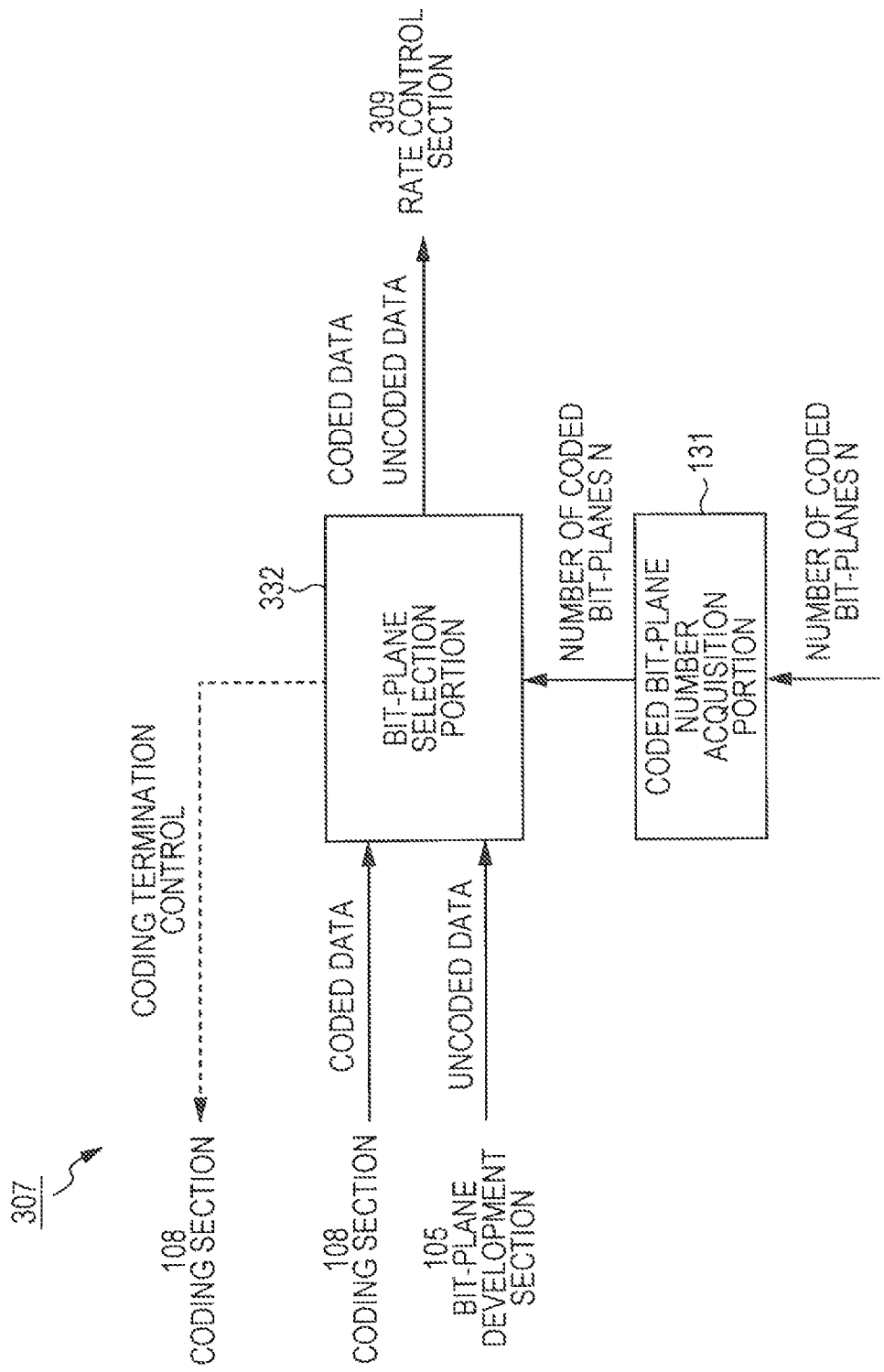
FIG. 24 is a block diagram illustrating an example of a principal configuration of the selection section of FIG. 23.

FIG. 24 is a block diagram illustrating an example of a principal configuration of the selection section 307 of FIG. 23. As shown in FIG. 24, the selection section 307 has basically the same configuration as that of the selection section 107 except that the selection section 307 has a bit-plane selection portion 332 instead of the processing selection portion 132.

The bit-plane selection portion 332 selects the coded data supplied from the coding section 108 or the uncoded data supplied from the bit-plane development section 105, and supplies the selected data to the rate control section 309.

The bit-plane selection portion 332 performs the selection on the basis of the number of coded bit-planes N acquired by the coded bit-plane number acquisition portion 131. The bit-plane selection portion 332 selects the coded data at the levels higher than the N-th level, and supplies the data to the rate control section 309. Further, the bit-plane selection portion 332 selects the uncoded data at the levels lower than the (N+1)th level, and supplies it to the rate control section 309.

When selecting the coded data at the levels higher than the N-th level, the bit-plane selection portion 332 controls the coding section 108 so as to terminate the coding for the processing target code block. That is, when acquiring the coded data supplied from the coding section 108 by N pieces and supplying the data to the rate control section 309, the bit-plane selection portion 332 terminates the coding processing of the coding section 108, then acquires the uncoded data, which is supplied from the bit-plane development section 105, by (N+1) pieces, and supplies the data to the rate control section 309.

As described above, the selection section 307 easily selects the coded data with respect to the higher N-bits, and selects the uncoded data with bits lower than that. In other words, the encoder 300 is able to reliably control the position, at which the uncoded data is selected, on the basis of the designated number of bit-planes N.

Rate Control Section

Figure 25:
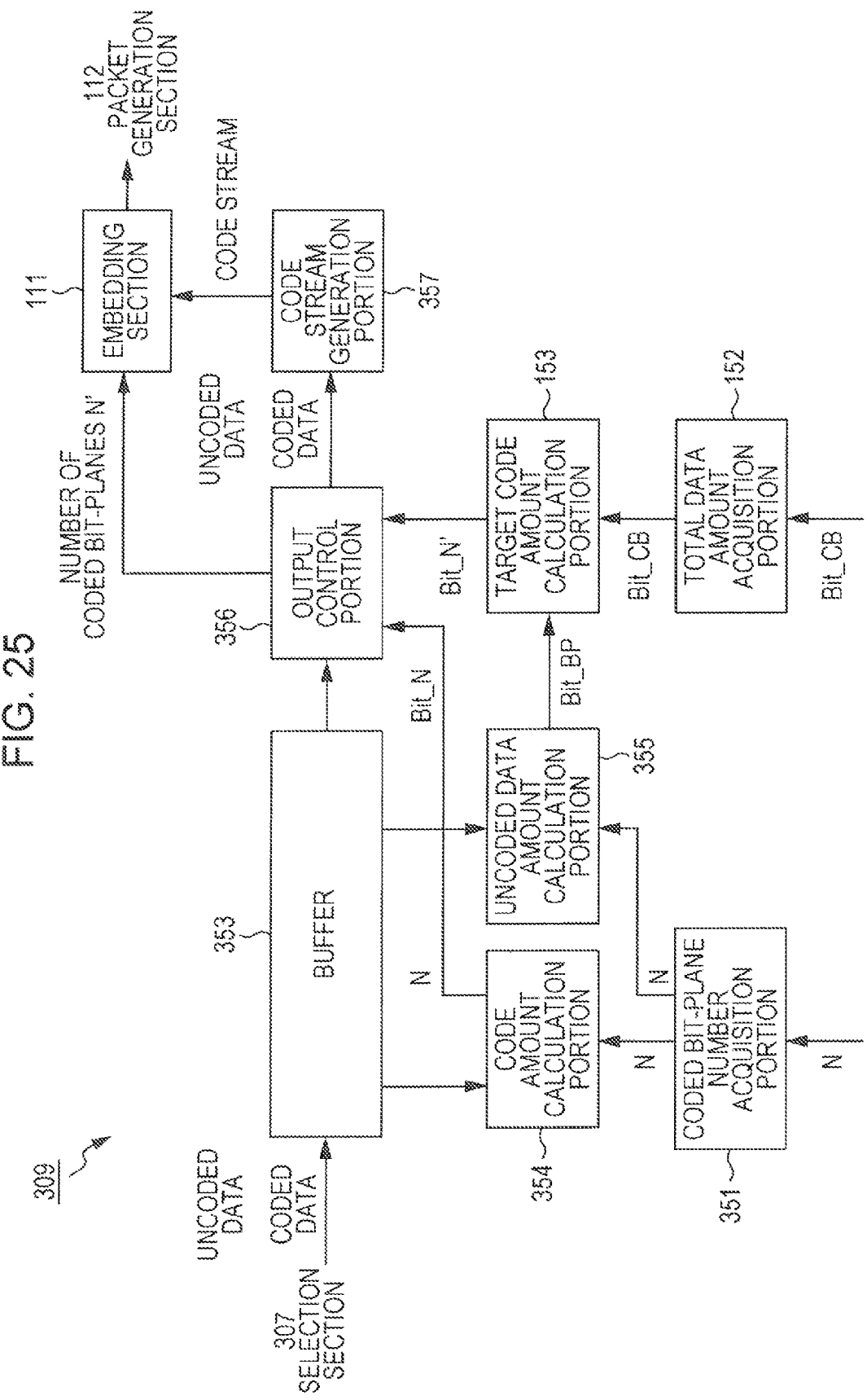
FIG. 25 is a block diagram illustrating an example of a principal configuration of the rate control section of FIG. 23.

FIG. 25 is a block diagram illustrating an example of a principal configuration of the rate control section 309 of FIG. 23. As shown in FIG. 25, the rate control section 309 has the embedding section 111, the total data amount acquisition portion 152, the target code amount calculation portion 153, a coded bit-plane number acquisition portion 351, a buffer 353, a code amount calculation portion 354, an uncoded data amount calculation portion 355, an output control portion 356, and a code stream generation portion 357.

The coded bit-plane number acquisition portion 351 acquires the number of coded bit-planes N acquired by the selection section 307, and supplies the number to the code amount calculation portion 354 and the uncoded data amount calculation portion 355.

The buffer 353 stores the coded data and uncoded data supplied from the selection section 307 in the supply order.

The code amount calculation portion 354 calculates the amount of code of the coded data (Bit_N) of the processing target code block acquired by the rate control section 309

(stored in the buffer 353), on the basis of the number of coded bit-planes N supplied from the coded bit-plane number acquisition portion 351. As described above, the coded data is supplied first, and then the uncoded data is supplied. That is, the first to N-th data pieces among the data pieces supplied from the selection section 307 are coded data, and the (N+1)th and following data pieces are uncoded data. Therefore, the code amount calculation portion 354 calculates the amount of data of the first to N-th data pieces (coded data) supplied from the selection section 307.

The code amount calculation portion 354 supplies the number of coded bit-planes N and the calculated amount of code (Bit_N) to the output control portion 356.

The uncoded data amount calculation portion 355 calculates the amount of data (amount of uncoded data (Bit_BP)) of the uncoded data of the processing target code block acquired by the rate control section 309 (stored in the buffer 353), on the basis of the number of coded bit-planes N supplied from the coded bit-plane number acquisition portion 351. As described above, the coded data is supplied first, and then the uncoded data is supplied. That is, the first to N-th data pieces among the data pieces supplied from the selection section 307 are coded data, and the (N+1)th and following data pieces are uncoded data. Therefore, the uncoded data amount calculation portion 355 calculates the amount of data of the (N+1)th and following data pieces (uncoded data) supplied from the selection section 307.

The uncoded data amount calculation portion 355 supplies to the calculated amount of uncoded data (Bit_BP) to the target code amount calculation portion 153.

The target code amount calculation portion 153 calculates the target amount of code (Bit_N') on the basis of the total amount of data (Bit_CB), which is allocated in the processing target code block acquired by the total data amount acquisition portion 152, and the amount of uncoded data (Bit_BP) which is calculated by the uncoded data amount calculation portion 355. The target code amount calculation portion 153 supplies the calculated target amount of code (Bit_N') to the output control portion 356.

The output control portion 356 reads the coded data and uncoded data, which are accumulated in the buffer 353, while performing the rate control, on the basis of the number of coded bit-planes N acquired by the coded bit-plane number acquisition portion 351, the amount of code (Bit_N) calculated by the code amount calculation portion 354, and the target amount of code (Bit_N') calculated by the target code amount calculation portion 153.

For example, by comparing the amount of code (Bit_N) with the target amount of code (Bit_N'), if the amount of code (Bit_N) is equal to or less than the target amount of code (Bit_N'), the output control portion 356 reads all the data pieces accumulated in the buffer 353, and supplies to the data pieces to the code stream generation portion 357.

Further, for example, if the amount of code (Bit_N) is greater than the target amount of code (Bit_N'), the output control portion 356 determines the number of coded data pieces (the number of coded bit-planes N'), which are read from the buffer 353, such that the amount of code is equal to or less than the target amount of code (Bit_N'). The output control portion 356 reads the N' coded data pieces (first to N'-th coded data pieces) on the higher-level bit side among the coded data pieces accumulated in the buffer 353, and supplies the data pieces to the code stream generation portion 357. Thereafter, the output control portion 356 reads all the uncoded data pieces accumulated in the buffer 353, and supplies the data pieces to the code stream generation portion 357.

As described above, the output control portion 356 performs the rate control by controlling the number of coded data pieces which are read from the buffer 353.

The output control portion 356 further supplies the number of coded bit-planes N' as the number of coded data pieces, which are read from the buffer 353, to the embedding section 111. For example, if the amount of code (Bit_N) is equal to or less than the target amount of code (Bit_N'), the number of coded bit-planes N' is equal to the number of coded bit-planes N.

The code stream generation portion 357 acquires the coded data and uncoded data which are supplied from the output control portion 356, similarly to the case of the synthesizing section 110, synthesizes the coded data and uncoded data, adds the headers and the like thereto, thereby generates a single code stream, and supplies the code stream to the embedding section 111.

The embedding section 111 embeds information, which represents the number of coded bit-planes N' supplied from the output control portion 356, at a prescribed position of the code stream supplied from the code stream generation portion 357.

As described above, similarly to the case of the rate control section 109, the rate control section 309 performs the rate control by preferentially deleting the coded data on the lower-level bit side. That is, the rate control section 309 does not delete the uncoded data in which there is no information loss, and performs the rate control. Therefore, it is possible to perform the rate control while suppressing deterioration in image quality. Further, the rate control section 309 easily calculates the target amount of code, and has only to control whether or not to delete the coded data on the basis of the target amount of code, whereby it is possible to easily realize the appropriate rate control.

Flow of Coding Processing

Next, referring to the flowchart of FIG. 26, an example of the flow of the coding processing executed by the encoder 300 will be described. The encoder 300, which codes moving image data, performs the coding processing to be described below on each frame.

Figure 14:
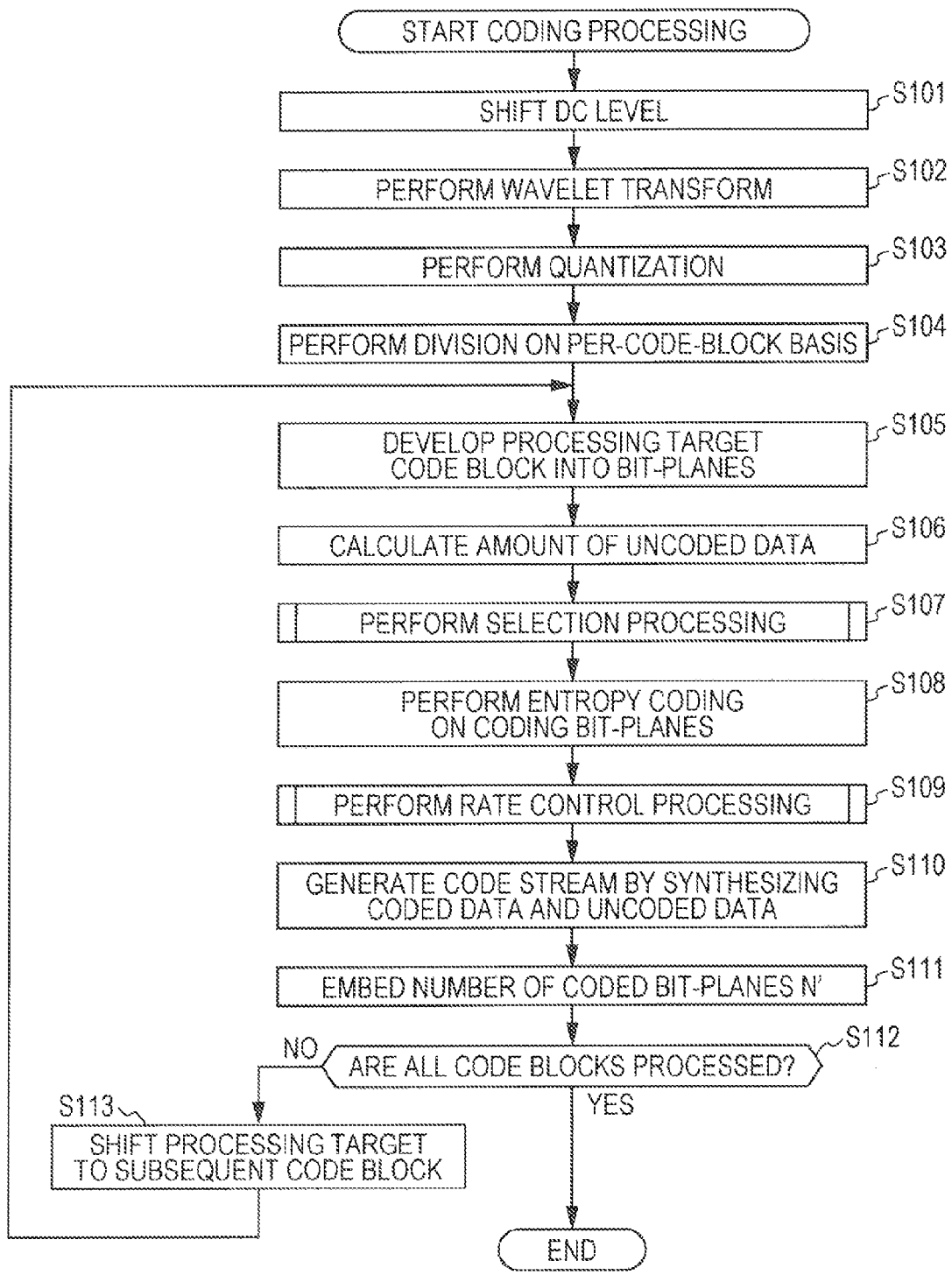
FIG. 14 is a flowchart illustrating an example of a flow of coding processing.
Figure 15:
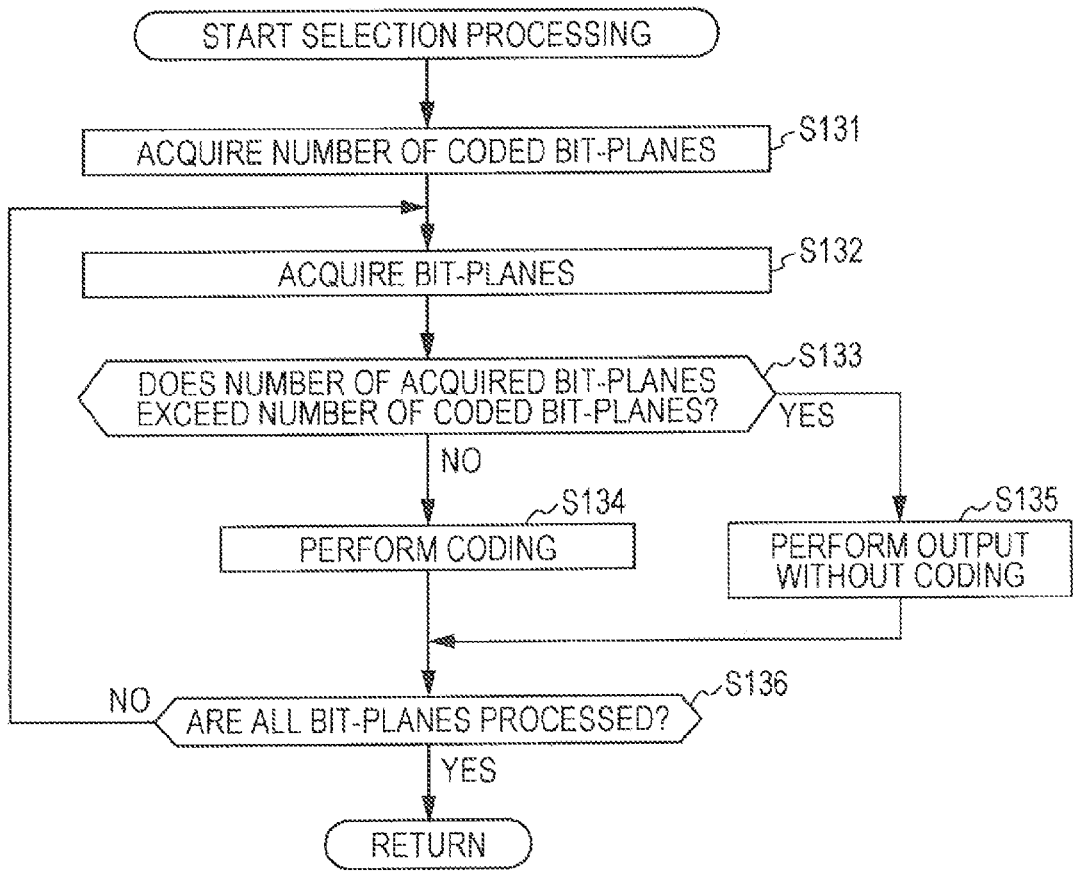
FIG. 15 is a flowchart illustrating an example of a flow of selection processing.

When the coding processing is started, each processing of steps S301 to S305 is performed in the same manner as each processing of steps S101 to S105 of FIG. 14, whereby the processing target code block is developed into bit-planes.

In step S306, the coding section 108 codes the bit-planes higher than the N-th level.

In step S307, the selection section 307 performs the selection processing so as to select the coded data, which is generated in step S306, at the levels higher than the N-th level and select the bit-planes (uncoded data), which are developed in step S305, at the levels lower than the (N+1)th level.

In step S308, the rate control section 309 performs the rate control, thereby deleting the coded data as necessary.

In step S309, the bit-plane development section 105 determines whether or not all the code blocks are processed. If it is determined that not all the code blocks are processed, the bit-plane development section 105 advances the processing to step S310, shifts the processing target to the subsequent code block, returns the processing to step S305, and repeats the subsequent processing.

If it is determined in step S309 that all the code blocks are processed by repeatedly executing the processing of steps S305 to S310, the coding processing is terminated.

In addition, the above-mentioned each processing may be executed in an order which is appropriately changed if there is no problem, or may be executed in parallel. For example, each processing of steps S306 and S307 may be executed in parallel with each other.

Flow of Selection Processing

Next, referring to the flowchart of FIG. 27, an example of the flow of the selection processing performed in step S307 of FIG. 26 will be described.

When the selection processing is started, the coded bit-plane number acquisition portion 131 acquires the number of coded bit-planes N in step S331.

In step S332, the bit-plane selection portion 332 starts acquiring the bit-planes (coded data or uncoded data) which are supplied from the coding section 108 and bit-plane development section 105.

In step S333, the bit-plane selection portion 332 selects the coded data from the first to N-th bit-planes.

Figure 26:
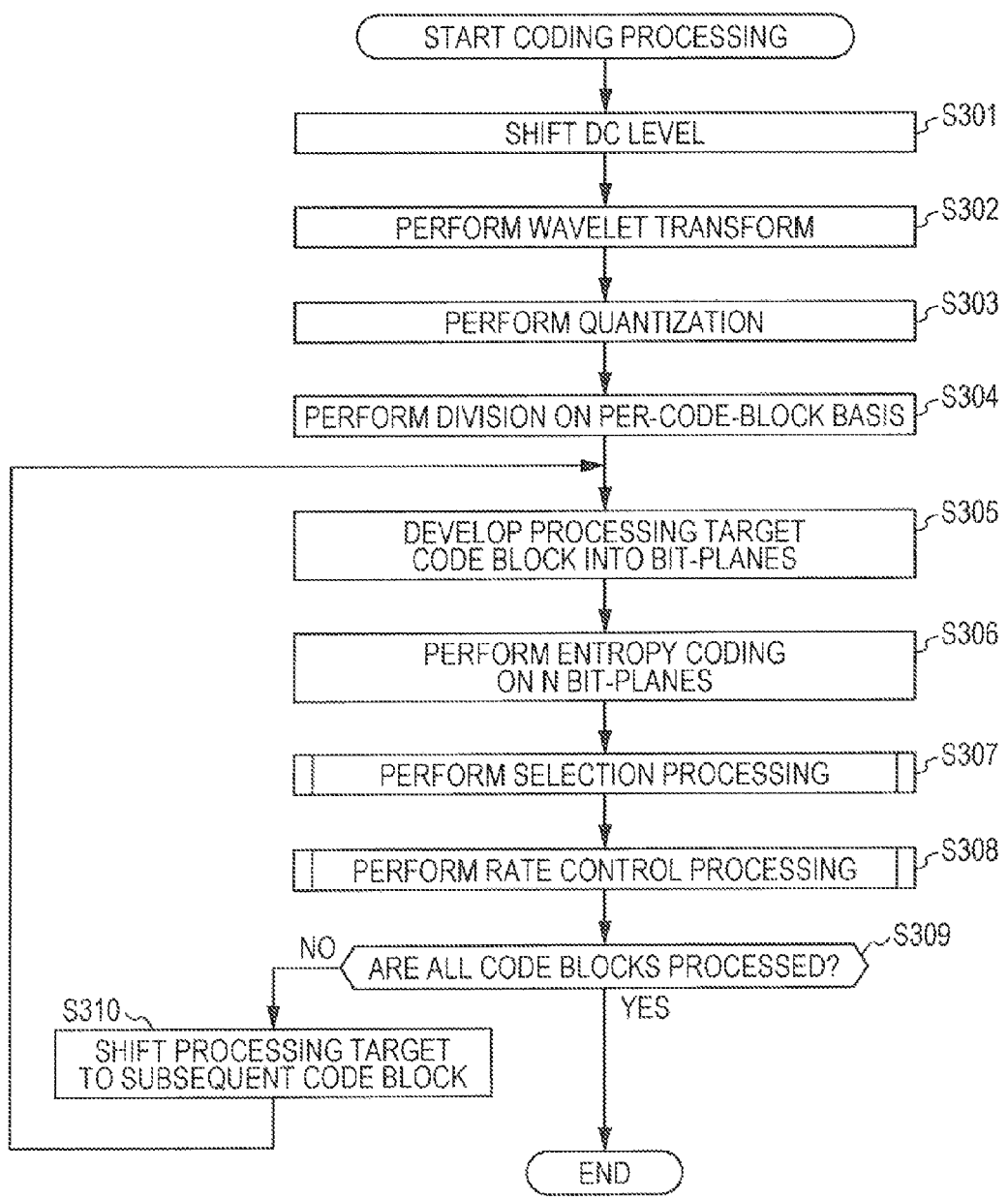
FIG. 26 is a flowchart illustrating another example of the flow of the coding processing.
Figure 27:
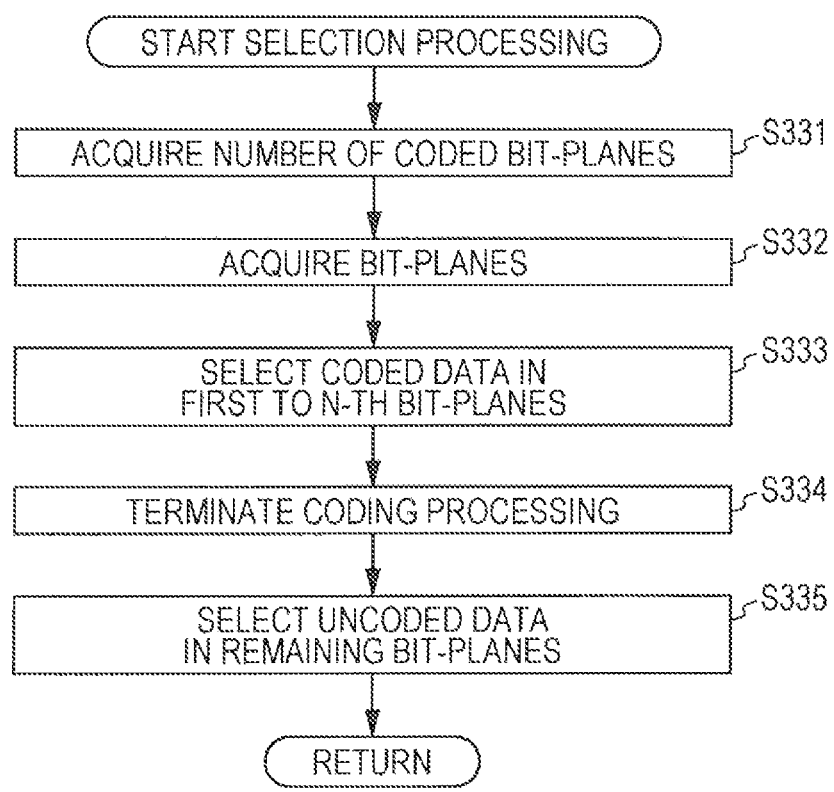
FIG. 27 is a flowchart illustrating another example of the flow of the selection processing.

In step S334, the bit-plane selection portion 332 terminates the coding processing which is executed in step S306 of FIG. 26.

In step S335, the bit-plane selection portion 332 selects the uncoded data from the (N+1)th and the following bit-planes.

When the above-mentioned processing is terminated, the bit-plane selection portion 332 terminates the selection processing, returns the processing to step S307 of FIG. 26, and executes the processing in and after step S308.

Rate Control Processing

Figure 28:
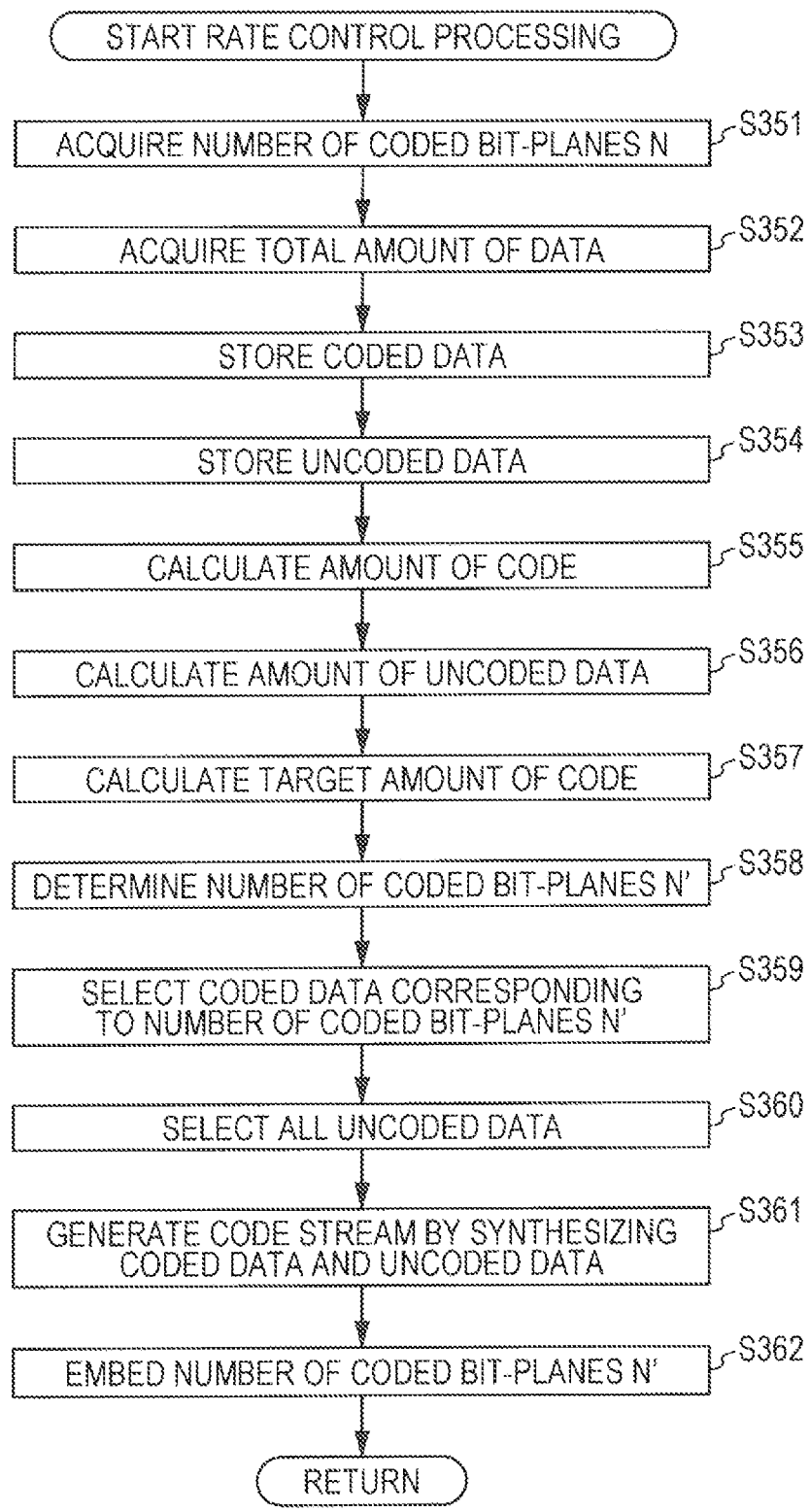
FIG. 28 is a flowchart illustrating another example of the flow of the rate control processing.

Next, referring to the flowchart of FIG. 28, an example of the flow of the rate control processing performed in step S308 of FIG. 26 will be described.

When the rate control processing is started, in step S351, the coded bit-plane number acquisition portion 351 acquires the number of coded bit-planes N. In step S352, the total data amount acquisition portion 152 acquires the total amount of data (Bit_CB) which is allocated in the processing target code block.

In step S353, the buffer 353 stores the coded data which is supplied from the selection section 307. In step S354, the buffer 353 stores the uncoded data which is supplied from the selection section 307.

In step S355, the code amount calculation portion 354 calculates the amount of code of the N coded data pieces (Bit_N) stored in step S353. In step S356, the uncoded data amount calculation portion 355 calculates the amount of uncoded data (Bit_BP) as the amount of the uncoded data stored in step S354. In step S357, the target code amount calculation portion 153 calculates the target amount of code (Bit_N') by subtracting the amount of uncoded data (Bit_BP) from the total amount of data (Bit_CB) which is acquired in step S352.

In step S358, the output control portion 356 determines the number of coded bit-planes N' on the basis of the amount of code (Bit_N) calculated in step S355, the target amount of code (Bit_N') calculated in step S357, and the like.

In step S359, the output control portion 356 selects the coded data, which corresponds to the number of coded bit-planes N' determined in step S358, among the coded data pieces accumulated in the buffer 353, and reads the coded data. In step S360, the output control portion 356 selects all the uncoded data pieces accumulated in the buffer 353, and reads the data pieces.

In step S361, the code stream generation portion 357 synthesizes the coded data selected in step S359 and the uncoded data selected in step S360, thereby generating a code stream.

In step S362, the embedding section 111 embeds the number of coded bit-planes N', which is determined in step S358, at the prescribed position of the code stream which is generated in step S361.

When the processing of step S362 is terminated, the embedding section 111 terminates the rate control processing, returns the processing in step S308 of FIG. 26, and executes the processing in and after step S309.

By performing various kinds of processing mentioned above, similarly to the case of the encoder 100, the encoder 300 is able to appropriately perform the rate control while suppressing an increase in processing time and deterioration in image quality. Accordingly, the encoder 300 is able to reduce the load by appropriately performing the rate control even in the case of the lossy coding.

Plural Components

Figure 29:
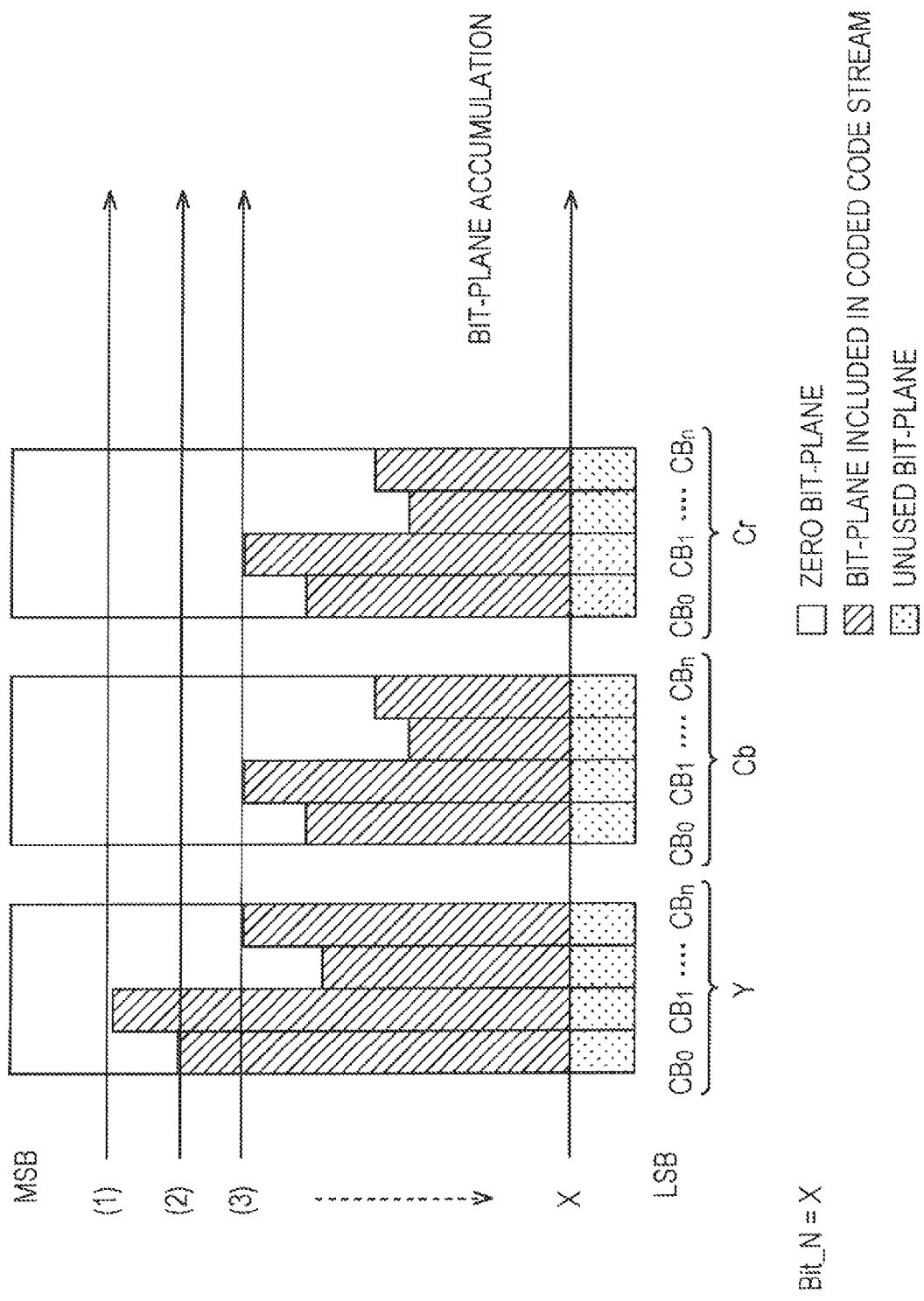
FIG. 29 is a diagram illustrating a brief overview of processing in a case of a plurality of components.

In addition, an image may be constituted by a plurality of components. In this case, for example, by performing the rate control mentioned above, scanning may be performed for each component. Further, for example, in the case of the first or second embodiment, at the time of performing the rate control, as shown in FIG. 29, the scanning may be performed through all the components. FIG. 29 is a diagram illustrating an example of the case of scanning the respective bit positions in all the components of Y component, Cb component, and Cr component.

In the example of FIG. 29, except for zero bit-planes, in the direction from the MSB to the LSB, in order of Y, Cb, and Cr, and in order from the coding pass positioned on the identical bit-plane, encoding is performed on a per-bit-plane basis, and the amount of generated code is accumulatively counted. Then, as a result of the accumulation, if it is determined that the number of bits accumulated up to a certain X bit-plane is sufficiently close to the target amount of code (Bit_N'), the accumulative count operation is stopped.

Figure 30:
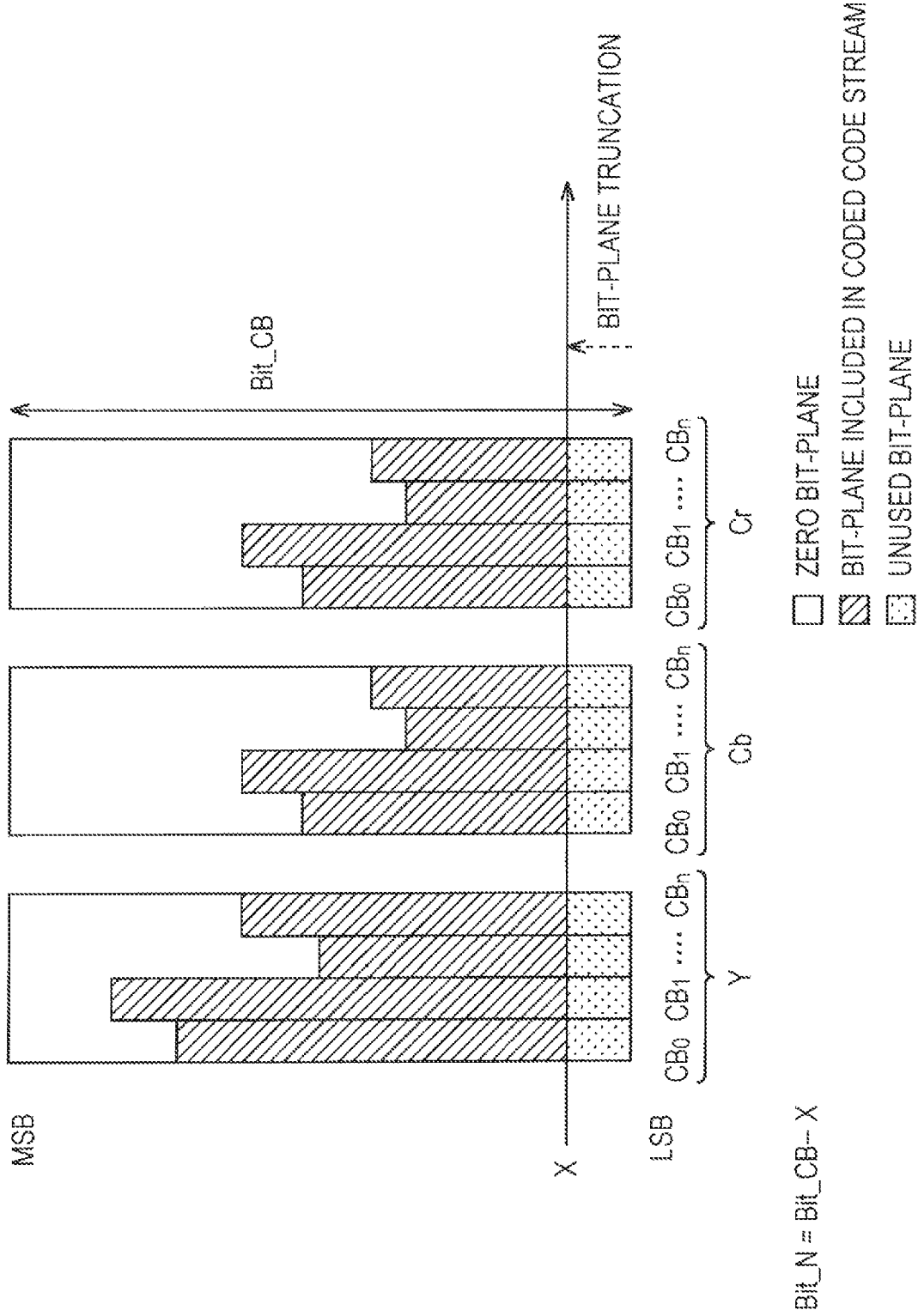
FIG. 30 is a diagram illustrating a brief overview of processing in a case of a plurality of components.

In the case of the third embodiment, as shown in FIG. 30, the coded data may be truncated in order from the LSB to the MSB for each bit-plane. Thus, the truncation control may be stopped at the time point at which the amount of data reaches the target amount.

It is apparent that the above-mentioned encoder 100, decoder 200, and encoder 300 may have other configurations. Further, the apparatuses may be configured as a system which is not only formed as a single apparatus but also formed as a plurality of apparatuses. For example, the apparatuses may be configured as a digital cinema editing apparatus, an archive system, an image database, a medical image record system, a network server, a non-linear editing apparatus, an authoring tool of a PC, a software module of the authoring tool, and the like.

4. Fourth Embodiment

Personal Computer

The above-described series of processing may be executed by hardware or software. In this case, for example, the series of processing may be implemented by a personal computer shown in FIG. 31.

Figure 31:
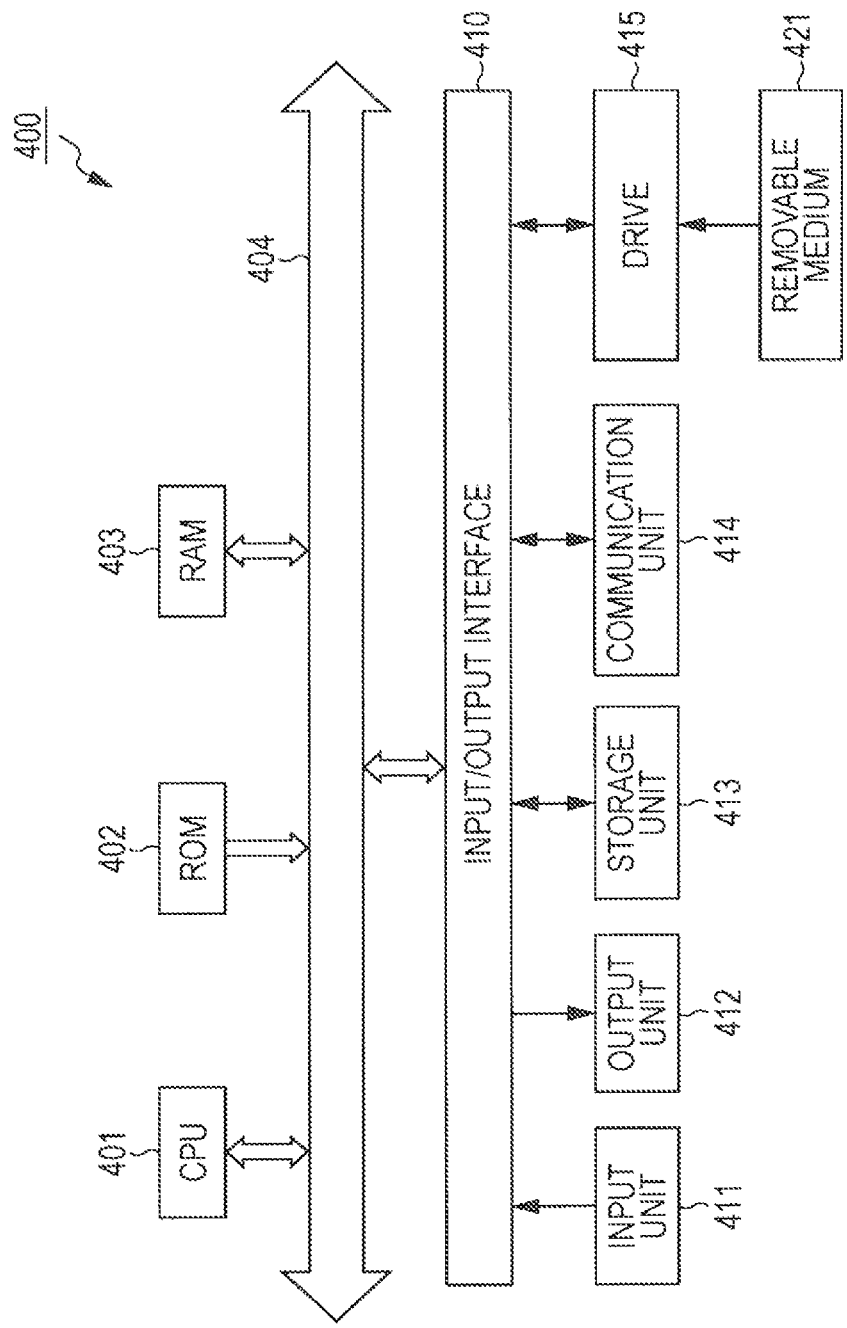
FIG. 31 is a block diagram illustrating an example of a configuration of a personal computer.

In FIG. 31, a CPU (Central Processing Unit) 401 of a personal computer 400 executes various kinds of processing in accordance with a program stored in a ROM (Read-Only Memory) 402 or a program loaded in a RAM (Random Access Memory) 403 from a storage unit 413. In the RAM 403, the CPU 401 not only executes various kinds of processing but also appropriately stores necessary data and the like.

The CPU 401, the ROM 402, and the RAM 403 are connected to each other via a bus 404. The bus 404 is connected to an input/output interface 410.

The input/output interface 410 is connected to an input unit 411 formed by a keyboard, a mouse, or the like, a display formed by a CRT (Cathode Ray Tube), an LCD (Liquid Crystal Display), or the like, an output unit 412 formed by a speaker or the like, the storage unit 413 formed by a SSD (Solid State Drive) such as a flash memory, a hard disk drive, or the like, and a communication unit 414 formed by a modem, a wired LAN (Local Area Network) or wireless LAN, or the like. The communication unit 414 performs communication processing via a network including the Internet.

The input/output interface 410 is connected to a drive 415 as necessary, and is appropriately equipped with a removable medium 421 such as a magnetic disk, an optical disc, a magneto-optical disc, or a semiconductor memory. With such a configuration, a computer program read from the removable medium 421 is installed in the storage unit 413 as necessary.

When the above-described series of processing is executed by software, programs constituting the software are installed from a network or a recording medium.

As shown in FIG. 31, for example, the recording medium includes the removable medium 421 which is provided separately from the main body of the apparatus in order to deliver a program to a user and in which the program is stored. The removable medium 421 is formed by a magnetic disk (including a flexible disk), an optical disc (including a CD-ROM (Compact Disc-Read Only Memory) and a DVD (Digital Versatile Disc)), a magneto-optical disc (including an MD (Mini Disc)), a semiconductor memory, or the like. In addition, the recording medium also includes the ROM 402, the hard disk drive included in the storage unit 413, and the like which are provided to a user in a state where those are built in the main body of the apparatus and in which programs are stored.

In addition, the program executed by the computer may be a program, which is processed in time-series in the order described in the specification, or a program which is processed in parallel or at a timing necessary when the program is called.

Further, in the specification, steps describing the program stored in the record medium include not only a step which is performed in time-series in recorded order but also a step which is not necessarily performed in time-series but is performed in parallel or separately.

Furthermore, in the specification, a system represents the entire apparatus including the plurality of devices.

Moreover, in the above-mentioned configuration, a single device (or a single processing section) may be formed as a plurality of devices (or processing sections). On the contrary, in the above-mentioned configuration, a plurality of devices (or processing sections) may be collectively formed as a single device (or a processing section). Further, another configuration may be added to the configuration of each device (or each processing section). Furthermore, when the configuration or the operation of the entire system is substantially the same, a part of the configuration of a certain device (or a processing section) may be included in the configuration of another device (or another processing section). That is, the disclosure is not limited to the above-mentioned embodiments, and may be modified into various forms without departing from the technical scope of the disclosure.

For example, the rate control section 109 of FIG. 1, the bit-plane synthesizing section 204 of FIG. 19, and the rate control section 309 of FIG. 23 may be configured as independent devices.

The present disclosure contains subject matter related to that disclosed in Japanese Priority Patent Application JP 2011-010527 filed in the Japan Patent Office on Jan. 21, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for encoding comprising:
    selection circuit selects for coding uncoded data with respective bit-planes with levels higher than a predetermined level of a bit-plane group;
    coding circuit codes the uncoded data selected for coding the selection circuit;
    a rate control circuit that performs rate control of coded data output by the coding circuit by preferentially deleting lower-level-side coded data, as necessary, from respective pieces of the coded data where the respective bit-planes with levels higher than the predetermined level of the bit-plane group, in which coefficient data obtained by orthogonally transforming image data is developed in a bit depth direction, are coded; and
    a synthesizing circuit that generates output data by synthesizing (a) the coded data output by the rate control circuit, from which the lower-level-side coded data is preferentially deleted as necessary by the rate control circuit, and (b) uncoded data output by the selection circuit having respective bit-planes with levels lower than the predetermined level of the bit-plane group.

2. The image processing apparatus according to claim 1, wherein the rate control circuit appropriately deletes the coded data such that an amount of code of the coded data included in the output data is equal to or less than a predetermined target amount of code.

3. The image processing apparatus according to claim 2, further comprising a target code amount calculation portion that calculates the target amount of code,
    wherein the rate control circuit appropriately deletes the coded data such that the amount of code of the coded data included in the output data is equal to or less than the target amount of code calculated by the target code amount calculation portion.

4. The image processing apparatus according to claim 3, where the target code amount calculation portion calculates the target amount of code by subtracting an amount of uncoded data, which is a total amount of data of the respective bit-planes with the levels lower than the predetermined level of the bit-plane group, from a total amount of allocated data.

5. The image processing apparatus according to claim 4, further comprising an uncoded data amount calculation section that calculates the amount of uncoded data,
    wherein the target code amount calculation portion calculates the target amount of code by subtracting the amount of uncoded data, which is calculated by the uncoded data amount calculation section, from the total amount of data.

6. The image processing apparatus according to claim 1, further comprising a coding section that codes the bit-planes,
    wherein the rate control circuit performs rate control of output data by preferentially deleting the lower-level-side coded data, as necessary, from the respective pieces of the coded data which is obtained by causing the coding section to code the respective bit-planes with the levels higher than the predetermined level.

7. The image processing apparatus according to claim 6, wherein the rate control circuit deletes the lower-level-side coded data by controlling the coding section so as not to code the lower-level-side coded data as necessary.

8. The image processing apparatus according to claim 7, further comprising a selection section that selects processing for the bit-planes,
- wherein the selection section selects the respective bit-planes with the levels higher than the predetermined level as bit-planes for performing coding,
- wherein the coding section codes the respective bit-planes which are selected by the selection section, and
- wherein the rate control circuit codes the lower-level-side coded data as necessary by controlling the coding section.

9. The image processing apparatus according to claim 6, wherein the rate control circuit deletes the lower-level-side coded data from the coded data, which is generated by the coding section, by not preferentially synthesizing the lower-level-side coded data.

10. An image processing encoding method of an image processing apparatus,
- wherein a selection section of the image processing apparatus selects for coding uncoded data with respective bit-planes with levels higher than a predetermined level of a bit-plane group,
- wherein a coding section codes the uncoded data selected for coding by the selection section,
- wherein a rate control section of the image processing apparatus performs rate control of coded data output by the coding section by preferentially deleting lower-level-side coded data, as necessary, from respective pieces of the coded data where the respective bit-planes with levels higher than the predetermined level of the bit-plane group, in which coefficient data obtained by orthogonally transforming image data is developed in a bit depth direction, are coded, and
- wherein a synthesizing section of the image processing apparatus generates output data by synthesizing (a) the coded data output by the rate control section, from which the lower-level-side coded data is preferentially deleted as necessary, and (b) uncoded data output by the selection section having respective bit-planes with levels lower than the predetermined level of the bit-plane group.

* * * * *